(12) United States Patent
Baker et al.

(10) Patent No.: US 11,449,498 B2
(45) Date of Patent: Sep. 20, 2022

(54) SYSTEMS AND METHODS FOR PROVIDING SOCIAL ELECTRONIC LEARNING

(71) Applicant: D2L Corporation, Kitchener (CA)

(72) Inventors: John Allan Baker, Waterloo (CA);
Kenneth James Chapman, Kitchener (CA); Brian John Cepuran, Kitchener (CA); Jeremy Jason Auger, Breslau (CA)

(73) Assignee: D2L Corporation, Kitchener (CA)

( * ) Notice: Subject to any disclaimer, the term of this patent is extended or adjusted under 35 U.S.C. 154(b) by 18 days.

(21) Appl. No.: 15/788,512

(22) Filed: Oct. 19, 2017

(65) Prior Publication Data

US 2018/0039669 A1 Feb. 8, 2018

Related U.S. Application Data

(63) Continuation of application No. 13/768,222, filed on Feb. 15, 2013, now abandoned, which is a continuation of application No. 12/402,872, filed on Mar. 12, 2009, now Pat. No. 8,402,055.

(51) Int. Cl.
*G06F 16/245* (2019.01)
*G06Q 10/10* (2012.01)
*G09B 5/00* (2006.01)

(52) U.S. Cl.
CPC ......... *G06F 16/245* (2019.01); *G06Q 10/107* (2013.01); *G09B 5/00* (2013.01)

(58) Field of Classification Search
CPC .... G06Q 90/00; G06Q 10/107; G06F 16/245; G06B 5/00
See application file for complete search history.

(56) References Cited

U.S. PATENT DOCUMENTS

| 3,574,263 A | 4/1971 | Del Alia |
| 4,820,167 A * | 4/1989 | Nobles ............... G09B 7/00 434/307 R |
| 6,289,360 B1 | 9/2001 | Kolodner et al. |
| 6,996,367 B2 | 2/2006 | Pfenninger et al. |
| 8,713,642 B2 | 4/2014 | Estrada et al. |

(Continued)

OTHER PUBLICATIONS

Edward F. Gehringer. "Reuse of Homework and Test Questions: When, Why, and How to Maintain Security?" IEEE 2004.*

(Continued)

*Primary Examiner* — Etienne P Leroux
(74) *Attorney, Agent, or Firm* — Bereskin & Parr LLP/S.E.N.C.R.L., s.r.l.

(57) ABSTRACT

A social electronic learning system, including a plurality of computing devices for communicating with a plurality of users in an educational community, and at least one server in communication with each of the plurality of computing devices, each server in communication with at least one data storage device configured to host a plurality of electronic portfolios, each electronic portfolio associated with one or more users of the plurality of users in the educational community, wherein each server is configured such that one or more users may associate one or more digital items with each electronic portfolio, and the plurality of users may take actions on the digital items in each electronic portfolio depending on authorization criteria.

20 Claims, 48 Drawing Sheets

(56) References Cited

U.S. PATENT DOCUMENTS

| | | | |
|---|---|---|---|
| 2002/0065697 A1* | 5/2002 | Cautley | G06Q 10/06 705/7.36 |
| 2002/0194166 A1* | 12/2002 | Fowler | G06F 16/3325 |
| 2003/0162152 A1* | 8/2003 | Lee | G09B 11/00 434/162 |
| 2003/0194690 A1 | 10/2003 | Wessner et al. | |
| 2004/0030781 A1* | 2/2004 | Etesse | G09B 5/00 709/225 |
| 2004/0088731 A1 | 5/2004 | Putterman et al. | |
| 2005/0058978 A1* | 3/2005 | Benevento | G09B 7/02 434/362 |
| 2006/0282304 A1 | 6/2006 | Bedard et al. | |
| 2006/0147890 A1* | 7/2006 | Bradford | G09B 7/00 434/362 |
| 2006/0242554 A1* | 10/2006 | Gerace | G06Q 30/0218 715/209 |
| 2007/0022418 A1* | 1/2007 | Velupillai | H04L 41/0681 717/168 |
| 2007/0244989 A1* | 10/2007 | Ryder | G06F 21/305 709/217 |
| 2009/0006972 A1* | 1/2009 | Karlson | H04L 67/06 715/737 |
| 2009/0012823 A1* | 1/2009 | Anderson | G06Q 10/10 705/5 |
| 2009/0019379 A1* | 1/2009 | Pendergast | G06F 16/93 715/762 |
| 2009/0133069 A1 | 5/2009 | Conness et al. | |
| 2009/0181356 A1* | 7/2009 | Dasgupta | G09B 7/00 434/362 |
| 2009/0293079 A1 | 11/2009 | McKee et al. | |

OTHER PUBLICATIONS

Howard E. Aidrich, "How to Hand Exams Back to Your Class", College Teaching, vol. 49, Issue 3 (2001).

* cited by examiner

Settings

◎ Dashboard  ✎ Search  ✉ Invites  👤 My Profile  ⚙ Settings

Dashboard Display Options — 161a

| Area | Displayed? | Sort Order | Number Of Items |
|---|---|---|---|
| Recent Comments | ☑ | 1 ▼ | 5 ▼ |
| Recent Invites | ☑ | 2 ▼ | 5 ▼ |
| Recently Modified Items | ☑ | 3 ▼ | 5 ▼ |
| Recent Reflections | ☑ | 4 ▼ | 5 ▼ |
| Items Recently Edited by Others | ☑ | 5 ▼ | 5 ▼ | ePortfolio Comment / Assessment Defaults — 161b

Default Settings: ☑ Allow comments on Reflections, Artifacts, Collections and Presentations by default ☑ Allow Assessments on Artifacts, Collections and Presentations by default

Invite Delivery Method — 161c

Invite Delivery Method: ☑ Email Invitation

Start Page — 161d

Default Area: [ePortfolio Home ▼]

Default Permission Profile — 161e

Select a default permission profile if you want new terms to be automatically

Default Profile: [-- Please Select a Permission Profile -- ▼]

Type Filter: ☑ Artifact  ☑ Presentation  ☑ Collection  ☑ Reflection

Tag Filter: New Tags: [           ] [Add Tag] ⓘ

Tags:

[Cancel]                                      [Save]

FIG. 7

Add Artifact

Step 1 : Select a Method

◁ Upload a File
Add a file from your computer or your locker.

✱ Create a File
Create a new HTML file containing formatted text, pictures, etc.

🌐 Create a Link
Use a URL to reference an existing website.

⤴ Import Results from a Course
Import quiz results, dropbox feedback, grades, or competency progress.

✱ Fill Out a Form
Complete a form available through one of your courses. You can fill out a form multiple times.

Cancel

Saved successfully (Mar 3, 2009 10:19 PM)

[Cancel] [Save]

Artifact Details — 210
- Name: Peter's new Artifact
- Description: Peter's new Artifact
- File: 📄 explore.tiff (117.73 KB) [Change File]

Tags — 212
- New Tags: [ ] [Add Tag] ❓
- Your Tags: new 🗑, different 🗑, biology 🗑, exam 🗑, test 🗑
- What are tags?

Comments / Assessments — 214

When you select the checkboxes for Comments and Assessments you allow users with sufficient permission to add comments or assessment based on rubrics

- Comments: ☑ Allow others to add/view comments if they have sufficient permission
- Assessments: ☑ Allow others to add/view assessments if they have sufficient permission

[Add Rubrics]

| Objective: Sign-off on Format | 🗑 |
| Surfing Rubric | 🗑 |
| Solar System Rubric | 🗑 |
| Solar System Rubric | 🗑 |

Presentations containing this Artifact — 216

Display this artifact in a presentation to make it part of a showcase of your work

[Add to Presentation]

| Presentation Name ▲ | Description | Last Modified | Actions |
|---|---|---|---|
| Test Presentation | This is a presentation test page | Feb 24, 2009 10:17 AM | ✏️ 🗑 |

Collections containing this Artifact — 218

What are collections?

[Add to Collection]

| Collection Name | Description | Last Modified ▼ | Actions |
|---|---|---|---|
| new collection 2 | this is the second collection | Mar 3, 2009 10:19 PM | ✏️ 🗑 |

[Cancel] [Save]

FIG. 12

| Add Rubrics | | |
|---|---|---|
| Search For: [        ] [Search] Show Search Options | | |
| | | 20 ▼ per page |
| | Rubric Name ▲ | Actions |
| ☐ | Algebra and Data Analysis<br>Course: Demonstration Course (Algebra) | ✎ |
| ☐ | Algebra Rubric<br>Course: Demonstration Course (Algebra) | ✎ |
| ☐ | Desire2Learn Rubric<br>Course: Demonstration Course Full | ✎ — 220a |
| ☐ | Objective: Completion Status<br>Course: 83Demo | ✎ |
| ☐ | Objective: Sign-off on Completion<br>Course: 83Demo | ✎ |
| ☑ | Objective: Sign-off on Format<br>Course: 83Demo | ✎ — 220b |
| ☑ | Solar System Rubric<br>Course: Exploring the Solar System | ✎ |
| ☑ | Solar System Rubric<br>Course: Exploring the Solar System at ALT-C 2008 | ✎ |
| ☑ | Surfing Rubric<br>Course: Demonstration Course (Surfing) | ✎ |
| ☐ | | |
| | | 20 ▼ per page |
| [Cancel] | | [Add Selected] |

| Add Assessment | | |
|---|---|---|
| Add Assessment | | |
| * Rubric: Peter's new Artifact ▼ Add — 231a | | |

| Evaluation | Level | Criteria |
|---|---|---|
| ○ | Level 3 | The explanation and/or justification is logically sound, clearly presented and fully developed. The response demonstrates a complete understanding of the material. |
| ⦿ | Level 2 | The response indicates an incomplete application of a reasonable strategy. The explanation and/or justification supports the material and is plausible, although it may not be well developed or complete. The response demonstrates a conceptual understanding of the material. |
| ○ | Level 1 | The response indicates little or no application of a reasonable strategy. The explanation and/or justification reveals serious flaws in reasoning. The explanation and/or justification may be incomplete or missing. The response demonstrates a minimal understanding of the material. |
| ○ | Level 0 | The response is completely incorrect or irrelevant. There may be no response, or the response may state, "I don't know." |

231b points to the Level 2 selection.

Cancel    Add

Permissions - Peter's new Artifact

My Artifacts | Edit Artifacts | View Artifacts | Permissions

| General Availability | Users |

236a → Profiles
Add the permissions profiles you want to share this artifact with. What are permission profiles?

[Add Profiles]

☐ ✕            20 ▼ per page

| Permission Profile | Remove |
|---|---|
| ☐ Everyone who is interesting | ✕ |

☐ ✕            20 ▼ per page

236b → Individual Users
Add specific people you want to share this artifact with.

[Add Users]

☐ ✕            20 ▼ per page

| First Name ▲, Last Name | V | C | +C | A | +A | E | Actions |
|---|---|---|---|---|---|---|---|
| ☐ Mike Kaastra | 🔑 | 🔑 | 🔑 | ● | 🔑 | ● | 🔑 ✕ |

☐ ✕            20 ▼ per page

Add Profiles

Select Profiles

Select the profiles that you want to have access to the ePortfolio content.

| | Permission Profile |
|---|---|
| ☐ | |
| ☐ | Everyone who is interesting |
| ☐ | |

Cancel | Save | Add and Send Invite

Invite - Peter's new Artifact

Invite: Everyone who is interesting

Include a message with the invite (optional):

* Subject: [Check this out]

Message: [Check out my new artifact!! And please provide comments!]

Save

Cancel

FIG. 21

| Add Users to Permission Profile | |
|---|---|
| Step 1 : Select Courses | |
| Select the course that the individual users you want to add are a part of. | |
| Search For: [____] Search   Show Search Options | |
| | 20 ▼ per page |

| Name, Code | Type |
|---|---|
| ○ Sandbox 2, | Organization |
| ○ Sandbox, Sandbox | Department |
| ○ Course Template, CT | Course Template |
| ○ Bulk Course Create Admin (Do Not Delete!) BCC | Course Offering |
| ○ Administration, Admin | Semester |
| ○ Administration, Admin | Department |
| ○ Utilities, Util | Semester |
| ○ Ongoing, Ongoin | Semester |

20 ▼ per page

[Cancel]                                [Next]

FIG. 22

Add Users to Permission Profile

Step 2 of 3 : Select Users

Search For: [ ] [Search] Show Search Options

[ ] 20 ▼ per page

| First Name ▲, Last Name | Username | Email |
|---|---|---|
| ☑ Mike Kaastra | mkaastra | Mike.Kaastra@desire2learn.com |

[ ] 20 ▼ per page

[Cancel]   [Back] [Next]

246 → (window)
248 → (row)

FIG. 23

Add Users to Permission Profile

Set Permissions for all Users

Permissions: ☑ View (V)
☑ See comments from others (C)
☑ Add comments (+C)
☐ See assessments from others (A)
☑ Add assessments (+A)
☐ Edit (E)

Back | Add | Add and Send Invite

Cancel

Edit Presentation - Test Presentation

Presentations | Edit Presentation | Permissions

View Presentation | Change Log | Access Log

[Properties] [Content/Layout] [Banner] [Theme]

[Cancel]  [Save]

Presentation Details

*Name: [Test Presentation]
Description: [This is a presentation page]

Tags

New Tags: [    ] [Add Tag] ?
Your Tags: bereskin, 🗑, neat, 🗑, cool, 🗑, external, 🗑 internal 🗑
What are tags?

Reflections

Choose which associated reflections you want to display for the presentation.   What are reflections?
Display in presentation: There are no reflections associated with this presentation.

Comments / Assessments

When you select the checkboxes for Comments and Assessments you allow users with sufficient permission to add comments or assessment based on rubrics Comments: ☑ Allow others to add/view comments if they have sufficient permission
Assessments: ☑ Allow others to add/view assessments if they have sufficient permission

[Add Rubrics]
| Solar System Rubric | 🗑 |
| Solar System Rubric | 🗑 |
| Objective: Sign-off on Format | 🗑 |

[Cancel]  [Save]

Shared Items

🗂 Shared Items

| Users | Items |

Users You've Shared Items With

You can share new items from the Artifacts, Collections, Presentations, or Reflections by setting an items permissions.

Search For: [          ] [Search]   Show Search Options

☐ 📇                                    20 ▾ per page

Users and Profiles

☐ Everyone who is interesting
☐ Mike Kaastra

☐ 📇                                    20 ▾ per page

New Form

Forms List  *New Form

Cancel  Save and New  Save

Form Details

*Name: New Form 2
Description: This is a second new form

Make Available To

Share the form with other groups to enable users enrolled in these groups to use the form in their ePortfolio
☑ Current Org. Units: Sandbox2
Add Org Units Cancel  Save and New  Save

Edit Form Contents - New Form

| 🗔 Forms List | ⚙️ Edit Form Details | 🏛️ Edit Form Content | ⇅ Re-order Fields |

➕ Add System Field | 👥 Add Custom Field | ➕ Add Separator | 🔍 Preview Form

New Form Contents

Changes to the form's content do not affect completed forms users have already added to their ePortfolios.

| Field Name | Data Type | Actions |
|---|---|---|
| First Name | System | 🗑️ |
| Last Name | System | 🗑️ |
| System Email | System | 🗑️ |
| CUSTOM FIELD | Radio Buttom List | ✏️ 🗑️ |
| SEPARATOR SAMPLE | Separator | 🗑️ |

SYSTEMS AND METHODS FOR PROVIDING SOCIAL ELECTRONIC LEARNING

RELATED APPLICATIONS

This application is a continuation of U.S. application Ser. No. 12/402,872, filed Mar. 12, 2009, the entire contents of which are hereby incorporated by reference herein for all purposes.

FIELD

The embodiments described herein relate to electronic learning, and more particularly to systems and methods for providing social electronic learning to one or more users in an educational community.

INTRODUCTION

Electronic learning (also called e-Learning or eLearning) generally refers to education or learning where users engage in education related activities using computers and other computer devices. For examples, users may enroll or participate in a course or program of study offered by an educational institution (e.g. a college, university or grade school) through a web interface that is accessible over the Internet. Similarly, users may receive assignments electronically, participate in group work and projects by collaborating online, and be graded based on assignments and examinations that are submitted using an electronic dropbox.

Electronic learning is not limited to use by educational institutions, however, and may also be used in governments or in corporate environments. For example, employees at a regional branch office of a particular company may use electronic learning to participate in a training course offered by their company's head office without ever physically leaving the branch office.

Electronic learning can also be an individual activity with no institution driving the learning. For example, individuals may participate in self-directed study (e.g. studying an electronic textbook or watching a recorded or live webcast of a lecture) that is not associated with a particular institution or organization.

Electronic learning often occurs without any face-to-face interaction between the users in the educational community. Accordingly, electronic learning overcomes some of the geographic limitations associated with more traditional learning methods, and may eliminate or greatly reduce travel and relocation requirements imposed on users of educational services.

Furthermore, because course materials can be offered and consumed electronically, there are fewer physical restrictions on learning. For example, the number of students that can be enrolled in a particular course may be practically limitless, as there may be no requirement for physical facilities to house the students during lectures. Furthermore, learning materials (e.g. handouts, textbooks, etc.) may be provided in electronic formats so that they can be reproduced for a virtually unlimited number of students. Finally, lectures may be recorded and accessed at varying times (e.g. at different times that are convenient for different users), thus accommodating users with varying schedules, and allowing users to be enrolled in multiple courses that might have a scheduling conflict when offered using traditional techniques.

However, some users of electronic learning systems may feel isolated when compared to traditional consumers of educational services due to the reduced face-to-face contact. In particular, there may be fewer opportunities to form social bonds between users and to participate in meaningful feedback and sharing between users.

Accordingly, there is a need for improved electronic learning systems and methods that address at least some of these concerns.

SUMMARY

According to one embodiment, there is provided a social electronic learning system, comprising: a plurality of computing devices for communicating with a plurality of users in an educational community; at least one server in communication with each of the plurality of computing devices, each server in communication with at least one data storage device configured to host a plurality of electronic portfolios, each electronic portfolio associated with one or more users of the plurality of users in the educational community; wherein each server is configured such that one or more users may associate one or more digital items with each electronic portfolio, and the plurality of users may take actions on the digital items in each electronic portfolio depending on authorization criteria.

The authorization criteria may include at least one permission profile associated with at least one of the digital items. The authorization criteria may include at least one global configuration profile associated with the plurality of electronic portfolios. The plurality of users may include at least one user authorized to set at least one configuration profile. The authorization criteria may include at least one security profile associated with at least one role, each role including at least one of the plurality of users.

The digital items may include at least one of artifacts, reflections, collections and presentations.

The actions that may be taken may include commenting on at least one of the digital items. The actions that may be taken may include assessing at least one of the digital items. The actions that may be taken may include at least one of reading, modifying, sharing, and creating at least one of the digital items.

The authorization criteria may include at least one permission-specific criterion. The permission-specific criteria may include enrollment data for the plurality of users.

Each server may be configured so that one or more users may have different levels of control over their associated electronic portfolios.

Each server may be configured so that the plurality of users may tag digital items using at least one keyword. Each server may be configured such that each user may perform keyword searches across the plurality of electronic portfolios. Results of each search may return digital items based on the tags associated therewith. The results of each search may return digital items about which that particular user was previously unaware.

At least some of the keywords may be dynamically defined by each user. At least some of the keywords may be predefined.

At least one of the digital items may be an assignment item prepared by a first user and presented to a second user for assessment. The assessment of the assignment item by the second user may be performed using at least one rubric.

After each assignment item is submitted for assessment, that assignment item may be locked against subsequent changes.

The assignment item may be a response to an examination and include answers to at least one question presented to the first user in association with the examination. The assessment of the assignment item may be returned to the first user only with data that the second user has determined should be returned. The assessment of the assignment item may be returned to the first user without the plurality of questions.

At least one digital item may include at least one collection, each collection including a plurality of digital items. The plurality of digital items in each collection may include local digital items associated with a particular electronic portfolio and remote digital items not associated with that particular electronic portfolio. At least one of the remote digital items may be associated with a different electronic portfolio. At least one of the remote digital items may be a linked item external to the social electronic learning system.

At least one of the plurality of digital items in each collection may be associated therewith based on a manual selection of at least one digital item. At least one of the plurality of digital items in each collection may be associated therewith based on dynamic associations formed using at least one keyword associated with at least one digital item.

Each user may have a personal profile, and the personal profile may be displayed to other users of the plurality of users differently depending on at least one context.

At least one of the electronic portfolios may include at least one presentation. Each presentation may include at least one digital item and have at least one theme associated therewith. At least a portion of each theme may be controlled by at least one global theme variable. Each presentation may be shared with other users based on a permissions profile set by the user creating the presentation.

According to another embodiment, there is provided a method of providing a social electronic learning system, comprising: identifying a plurality of users in an educational community; providing a plurality of computing devices for communicating with the plurality of users in the educational community; providing at least one server in communication with each of the plurality of computing devices, each server having at least one data storage device coupled thereto and configured to host a plurality of electronic portfolios, each electronic portfolio associated with one or more users of the plurality of users in the educational community; and wherein each server is configured such that one or more users may associate one or more digital items with each electronic portfolio, and the plurality of users may take actions on the digital items in each electronic portfolio depending on authorization criteria.

According to yet another embodiment, there is provided a physical computer readable medium including computer executable instructions which, when executed on a computing device, cause the computing device to: identify a plurality of users in an educational community; identify a plurality of computing devices for communicating with the plurality of users in the educational community; communicate with each of the plurality of computing devices; communicate with at least one data storage device configured to host a plurality of electronic portfolios, each electronic portfolio associated with one or more users of the plurality of users in the educational community; and allow one or more users to associate one or more digital items with each electronic portfolio, and the plurality of users to take actions on the digital items in each electronic portfolio depending on authorization criteria.

Further aspects and advantages of the embodiments described herein will appear from the following description taken together with the accompanying drawings.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIG. 7 is a screenshot of a settings page for the system of FIG. 1A;

FIG. 10 is a screenshot of an add artifacts page for the system of FIG. 1A;

FIG. 12 is a screenshot of the details of an added artifact;

FIG. 13 is a screenshot of an add rubrics page for the system of FIG. 1A;

FIG. 17 is a screenshot of an add assessment page for the artifact shown in FIG. 14;

FIG. 18 is a screenshot of a permissions profiles page for the artifact shown in FIG. 14 for setting a general availability of the artifact;

FIG. 19 is a screenshot of a permissions profiles page for the artifact shown in FIG. 14 for setting a specific user availability for the artifact;

FIG. 20 is a screenshot of an add profiles page for setting the permissions profiles for the artifact shown in FIG. 14;

FIG. 21 is a screenshot of an invitation page for the artifact shown in FIG. 14 for sending an invitation to other users;

FIG. 22 is a screenshot of a course selection page for selecting users being added to the permissions profile for the artifact shown in FIG. 14;

FIG. 23 is a screenshot of a user selection page for selecting users being added to the permissions profile for the artifact shown in FIG. 14;

FIG. 24 is a screenshot of a permissions selection page for adjusting the actions the users selected in FIG. 23 can take on the artifact shown in FIG. 14;

FIG. 28 is a screenshot of the collections management page of FIG. 26 showing items added to the collection of FIG. 27;

FIG. 30 is a screenshot of another add items page for adding specific items to the collection of FIG. 27;

FIG. 35 is a screenshot of a presentations page for configuring the properties of a presentation;

FIG. 40 is a screenshot of a reflections management page for the system of FIG. 1A;

FIG. 41 is a screenshot of a shared items management page for the system of FIG. 1A;

FIG. 43 is a screenshot of a permissions profile management page for the system of FIG. 1A;

FIG. 45 is a screenshot of a new forms page for creating forms;

FIG. 46 is a screenshot of an edit forms page for editing forms; and

DETAILED DESCRIPTION

Figure 1A:
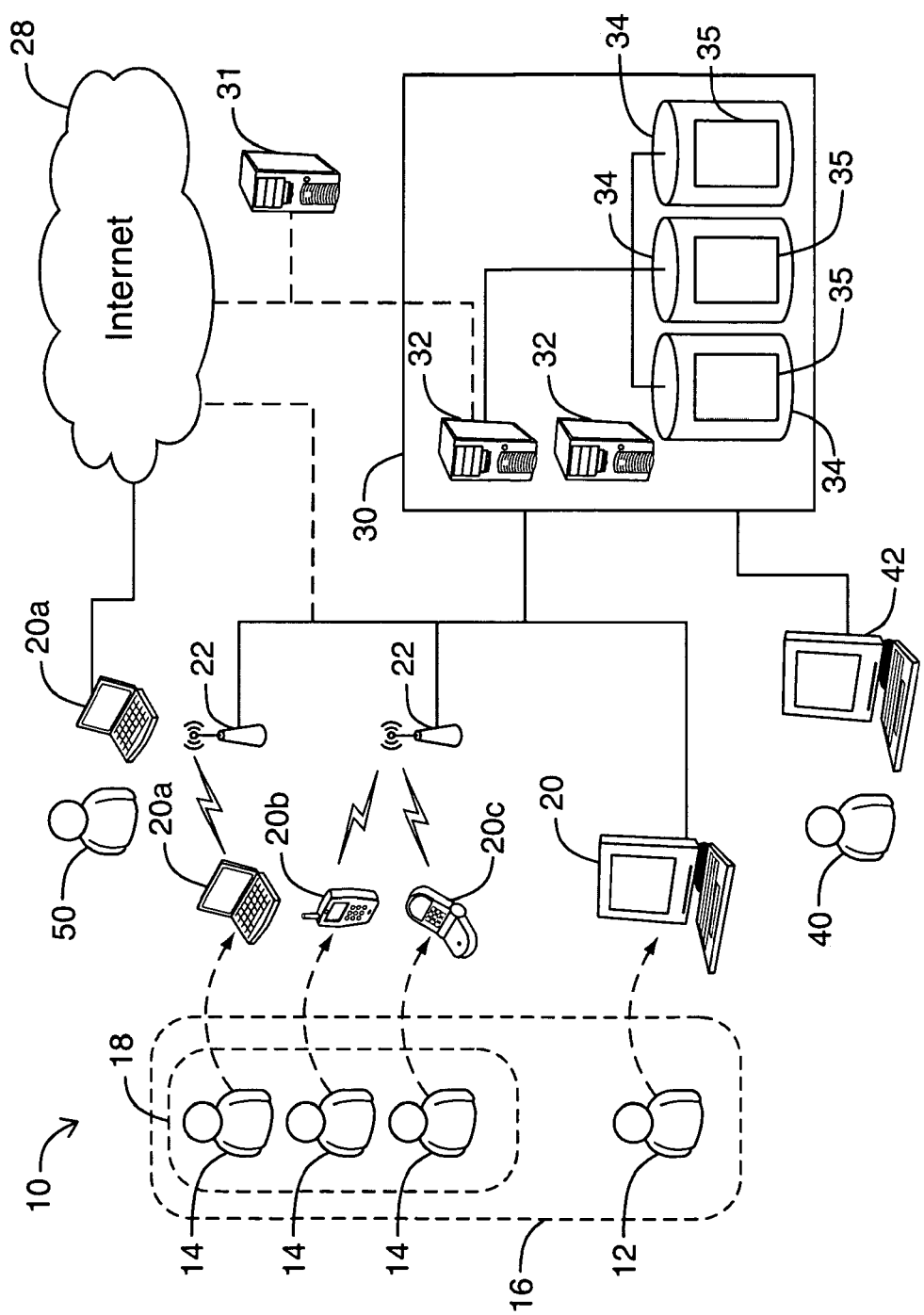
FIG. 1A is a block diagram illustrating a system for providing social electronic learning according to one embodiment.

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described herein in any way, but rather as merely describing the implementation of various embodiments as described.

The embodiments of the systems and methods described herein may be implemented in hardware or software, or a combination of both. For example, some embodiments may be implemented in computer systems and computer programs, which may be stored on a physical computer readable medium, executable on programmable computers each comprising at least one processor, a data storage system (including volatile and non-volatile memory and/or storage elements), at least one input device (e.g. a keyboard or mouse), and at least one output device (e.g. a display screen, a network, or a remote server). For example and without limitation, the programmable computers may include personal computers, laptops, netbook computers, personal data assistants (PDA), cell phones, smart phones, gaming devices, and other mobile devices.

In some embodiments, program code can be applied to input data to perform the functions described herein and to generate output information. The output information can then be supplied to one or more output devices for outputting to one or more users.

Turning now to FIG. 1A, illustrated therein is a system 10 for providing social electronic learning according to one embodiment. Using the system 10, one or more users 12, 14 may communicate with an educational service provider 30 to participate in and consume educational services. The educational service provider 30 may be part of or associated with a conventional educational institution (e.g. a high school, university or college), may be generally associated with any other entity that provides educational services (e.g. a company offering training courses), or may be an independent service provider (e.g. for individual electronic learning).

In some embodiments, an educational community can be defined that includes one or more users in the system. For example, as shown in FIG. 1A, an educational community 16 has been defined to include the users 12, 14. The educational community 16 may include some users 12, 14 that are interested in learning, other users that may lecture or teach courses to the users 12, 14, other users that assess assignments prepared by the users 12, 14, and generally any other persons who may be interested in social educational learning using the system 10. In some examples, one or more of the users 12, 14 may be associated with more than one educational community (e.g. user 12 may belong to two educational communities).

In some examples, a number of users (e.g. the users 14) may be associated with one or more logical groups 18 that can be defined in various ways. For example, one logical group 18 could include users 14 that are enrolled in a particular course (e.g. advanced calculus, introduction to biology, basic woodworking, etc.) or are part of a group within each course (e.g. a lab group). Other example logical groups 18 could include users 14 that share common interests (e.g. interests in a particular sport), that participate in common activities (e.g. users that are members of a choir or a club), and/or have similar attributes (e.g. users that are male, users under twenty-one years of age, etc.).

The communication between the users 12, 14 and the educational service provider 30 can occur either directly or indirectly using any suitable computing device. For example, the first user 12 may use a computing device 20 such as a desktop computer that has at least one input device (e.g. a keyboard and a mouse) and at least one output device (e.g. a display screen and speakers).

The computing device 20 may be connected to the service provider 30 via any suitable communications channel. For example, the computing device 20 may be communicate to the educational service provider 30 over a local area network (LAN) or intranet, or may communicate with the educational service provider 30 using an external network (e.g. by using a browser on the computing device 20 to browse to one or more web pages presented over the Internet 28).

In some examples, one or more of the users 12, 14 may be required to authenticate their identities in order to communicate with the educational service provider 30. For example, a first user 12 may be required to input their login name and/or a password associated with their particular user account to gain access to the system 10.

The computing device 20 can generally be any other suitable device for facilitating communication between the users 12, 14 and the educational service provider 30. For example, the computing device 20 could be a laptop 20a that may be wirelessly coupled to an access point 22 (e.g. a wireless router or a cellular communications tower), a wirelessly enabled personal data assistant (PDA) 20b, or a smart phone 20c.

In some embodiments, the wireless access points 22 may connect to the educational service provider 30 through a data connection established over the LAN or intranet. Alternatively, the wireless access points 22 may be in communication with the educational service provider 30 via the Internet 28 or another external data communications network. For example, the user 14 may use the smart phone 20c to browse to a webpage that displays elements of a social electronic learning system.

In some examples, the webpage may be configured to be displayed on a smaller screen and to accommodate other limitations of the smart phone 20c.

The educational service provider 30 generally includes a number of functional components for facilitating the provision of social electronic learning services. For example, the educational service provider 30 generally includes one or more servers 32, each having one or more processors. The servers 32 are configured to send information (e.g. HTML) to be displayed on one or more computing devices 20 in association with the social electronic learning system 10. The servers 32 are also generally configured to associate the users 12, 14 with a plurality of electronic portfolios as will be described in greater detail below.

The educational service provider 30 also generally includes one or more data storage devices 34 that are in communication with the servers 32, and could include a relational database (such as a SQL database), or any other suitable data storage device. The data storage devices 34 are configured to host data 35 (including the plurality of electronic portfolios), as will be described in further detail below.

In particular, the data 35 in the data storage devices 34 may include one or more digital items that are associated with one or more electronic portfolios. For example, the data 35 may include different artifacts, collections, presentations, comments, assessments and/or reflections in association with one or more electronic portfolios, as will be described in greater detail below.

The data storage devices 34 may also store authorization criteria that define what actions may be taken by the users 12, 14 on the digital items that are associated with the electronic portfolios.

The authorization criteria may include at least one permission profile associated with at least one of the digital items. Each permission profile may be set by one of the users 12, 14 who associates a particular digital item with a particular electronic portfolio.

The authorization criteria may also include at least one global configuration profile associated with the plurality of electronic portfolios. The global configuration profile could be a system wide variable or setting that sets limits on or controls what actions can be taken by the users 12, 14 (e.g. whether certain elements or modules of the system 10 are visible).

The authorization criteria may also include at least one security profile associated with at least one role. For example, one role could be defined for users who are primarily responsible for teaching or assessing work product from other users. Users with such a role may have a security profile that allows them to post assignments to the electronic portfolios associated with users that are enrolled in a particular course.

In some embodiments, one particular authorization criterion may override another authorization criterion. For example, even though a particular permissions profile for a particular digital item (e.g. an artifact or collection) may not allow other users to comment on that particular digital item, users that belong to certain roles may have security settings that allow them to override the permissions profile and comment on that digital item.

In some embodiments, some of the authorization criteria may be defined by specific users 40 who may or may not be part of the educational community 16. For example, users 40 may be permitted to define global configuration profiles for the system 10, define roles within the system 10, set security profiles associated with the roles, and assign the roles to particular users 12, 14 in the system 10. The users 40 may use another computing device 42 (e.g. a desktop computer) to accomplish these tasks.

The data storage devices 34 may also be configured to store other information, such as personal information about the users 12, 14 of the system 10, information about which courses the users 12, 14 are enrolled in, roles to which the users 12, 14 are assigned, particular interests of the users 12, 14 and so on.

The servers 32 and data storage devices 34 may also be configured to provide other electronic learning capabilities (e.g. allowing users to enroll in courses), and/or may be in communication with one or more other service providers that provide such other electronic learning capabilities.

In some embodiments, the system 10 may also have one or more backup servers 31 that may duplicate some or all of the data 35 stored on the data storage devices 34. The backup servers 31 may be desirable to prevent data loss in the event of an accident such as a fire, flooding, or theft.

In some embodiments, the backup servers 31 may be directly connected to the educational service provider 30 but located within the system 10 at a different physical location. For example, the backup servers 31 could be located at a remote storage location at a distance from the service provider 30, and the service provider 30 could connect to the backup server 31 using a secure communications protocol to ensure that the confidentiality of the data 35 is maintained.

In some embodiments, one or more public users 50 may be provided with access to specific digital items associated with particular electronic portfolios. For example, the public users 50 may or may not be part of the educational community 16, but may be interested in viewing and taking other actions on the digital items in the system 10. For example, the public users 50 may be parents or family of the first user 12, and may be interested in viewing a particular presentation the first user 12 has prepared.

In some examples, the public users 50 may not be required to authenticate themselves to the educational service provider 30 (e.g. by entering login information and/or a password) to gain access to the system 10. In other cases, the public users 50 may be required to authenticate themselves (e.g. by providing login information).

As introduced above, the system 10 may provide a social electronic learning environment for the users 12, 14 by hosting a plurality of electronic portfolios. Each electronic portfolio may be associated with one or more users 12, 14 in the system 10. For example, in some embodiments each individual user 12, 14 may have their own personal electronic portfolio. In other embodiments, multiple users 12, 14 may share a common electronic portfolio (e.g. the members of a lab group in a biology course may have a common electronic portfolio for the work performed as part of their lab group).

Each user 12, 14 who is associated with a particular electronic portfolio can generally associate one or more digital items with that electronic portfolio. Digital items might include artifacts (e.g. documents, text files, images, media files, homework assignments, reports, etc.), collections of artifacts, presentations prepared using collections and artifacts, as well as assessments, comments and personal reflections on artifacts, collections, and presentations, etc.

The electronic portfolios may generally integrate with various other components of an electronic learning system. In particular the electronic portfolios may be affected by elements such as what courses users 12, 14 are enrolled in, what assignments or deadlines users 12, 14 currently have, and/or what assignments and/or learning goals have been defined within the educational community 16.

Generally, the electronic portfolios may help users 12, 14 organize and contextualize their personal learning experiences, and coordinate users 12, 14 with any formal learning they may be involved with at a particular institution.

Figure 1B:
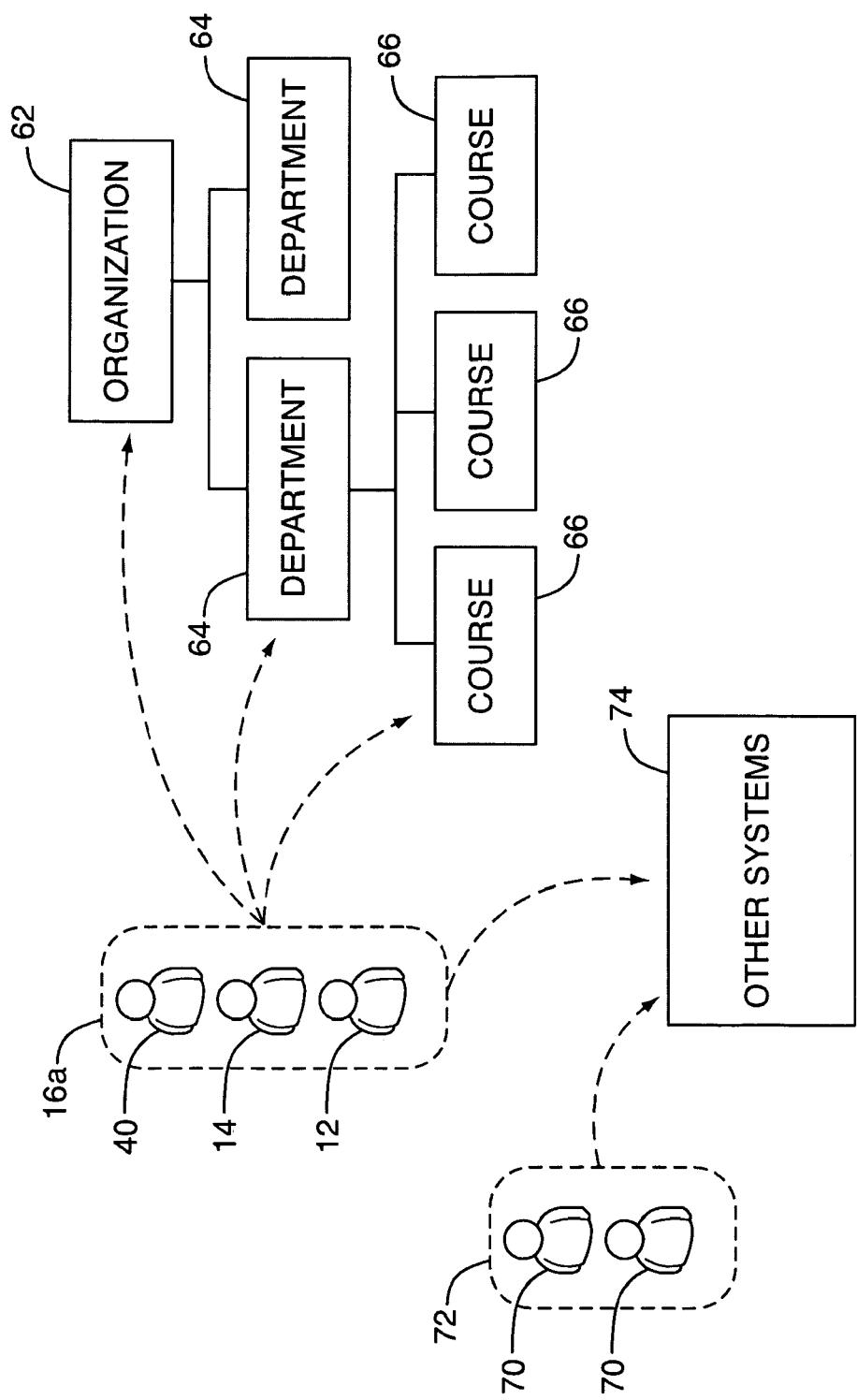
FIG. 1B is a block diagram of an exemplary interaction between users of the system of FIG. 1A and an organizational structure.

Turning now to FIG. 1B, as shown, users 12, 14 and 40 may define another educational community 16a. As will be described in greater detail below, the users 12, 14, 40 may define different authorization criteria within one or more organizations 62 (e.g. one or more educational institutions), within one or more departments 64 within a particular organization 62 (e.g. within the math, science and biology faculties of a particular university), or within one or more courses 66 (e.g. math, biology, etc.) offered by the organization 62.

For example, user 40 may be permitted to define global configuration profiles across the entire organization 62, define roles within the particular department 64 (e.g. members of the math faculty), set security profiles associated with those roles, and assign roles to other users (e.g. users 12, 14) in the educational community 16a.

Another user 14 may determined whether particular digital items are available for viewing in association based on factors such as whether those users enrolled in a particular course 66, or based on a "friends" list for that user 14.

In some examples, the users 12, 14, 40 may also define authorization criteria for other users 70 in other systems 74 (e.g. external systems, where the users 70 may be public users 50 that belong to another group 72, or other systems for providing social electronic learning).

Figure 2:
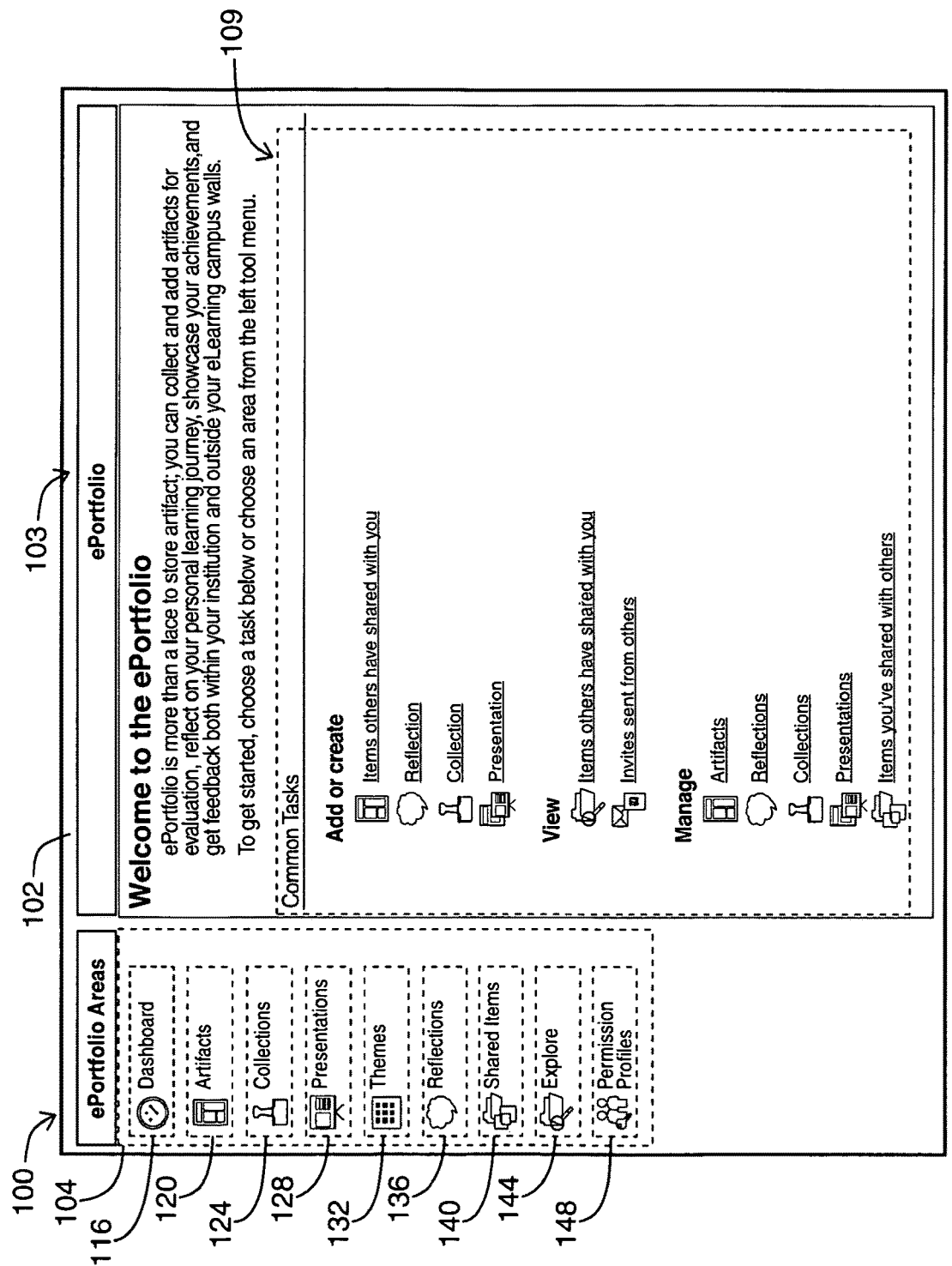
FIG. 2 is a screenshot of a home page for the system of FIG. 1A.

Turning now to FIG. 2, illustrated therein is a home page 102 for an electronic portfolio 100 that may be provided using the system of FIG. 1A.

The electronic portfolio 100 may generally be presented using any suitable techniques, such as via a series of web pages that may be accessed using a web browser (e.g. Internet Explorer, Firefox, Safari, Chrome, etc.). For example, as shown, the electronic portfolio 100 is presented as a webpage 103 that includes a plurality of display areas (e.g. one or more frames).

In FIG. 2, the webpage includes a navigation area 104 provided on a left side of the webpage 103, and a content area 109 provided on a right side of the webpage 103. It will be understood, however, that the particular position and size of the areas on the webpage may be generally varied.

The navigation area 104 of each electronic portfolio 100 may include a plurality of links (which may be embodied as buttons, as shown) that link to various pages associated with the electronic portfolio 100.

Figure 3:
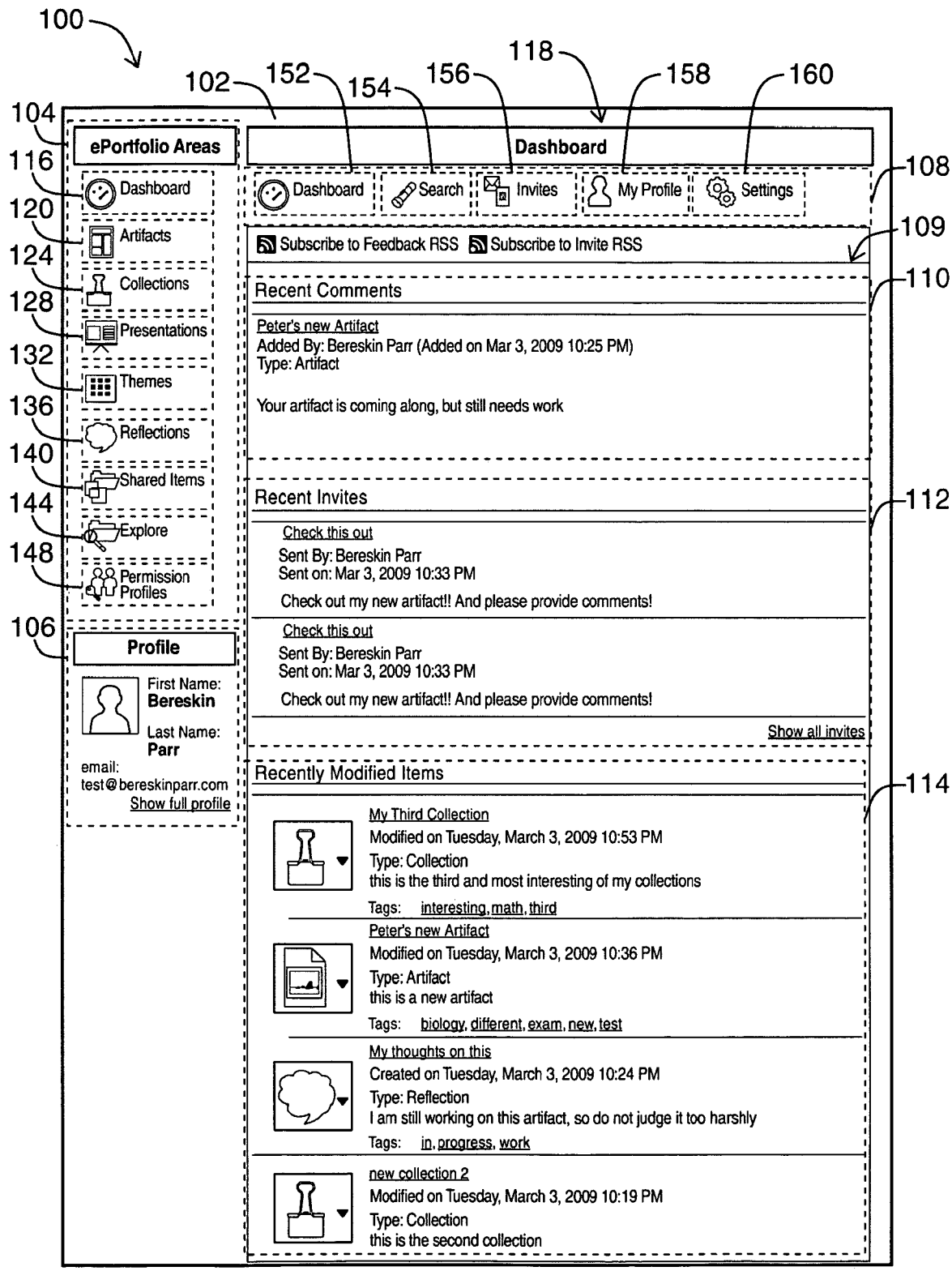
FIG. 3 is a screenshot of a dashboard page for the system of FIG. 1A.

The navigation area 104 may also serve as a menu that provides a consistent user interface to allow users to more easily navigate through the electronic portfolio 100. For example the navigation area 104 may include a dashboard button 116 associated with a dashboard page 118 (as generally shown in FIG. 3) so that when the dashboard button 116 is selected (e.g. using a cursor, a touch screen, a keyboard, etc.), the dashboard page 118 is displayed. The dashboard page 118 may be a main screen for each electronic portfolio 100, and may provide users with various search and browsing options for accessing other pages and various digital items within each electronic portfolio 100.

Figure 8:
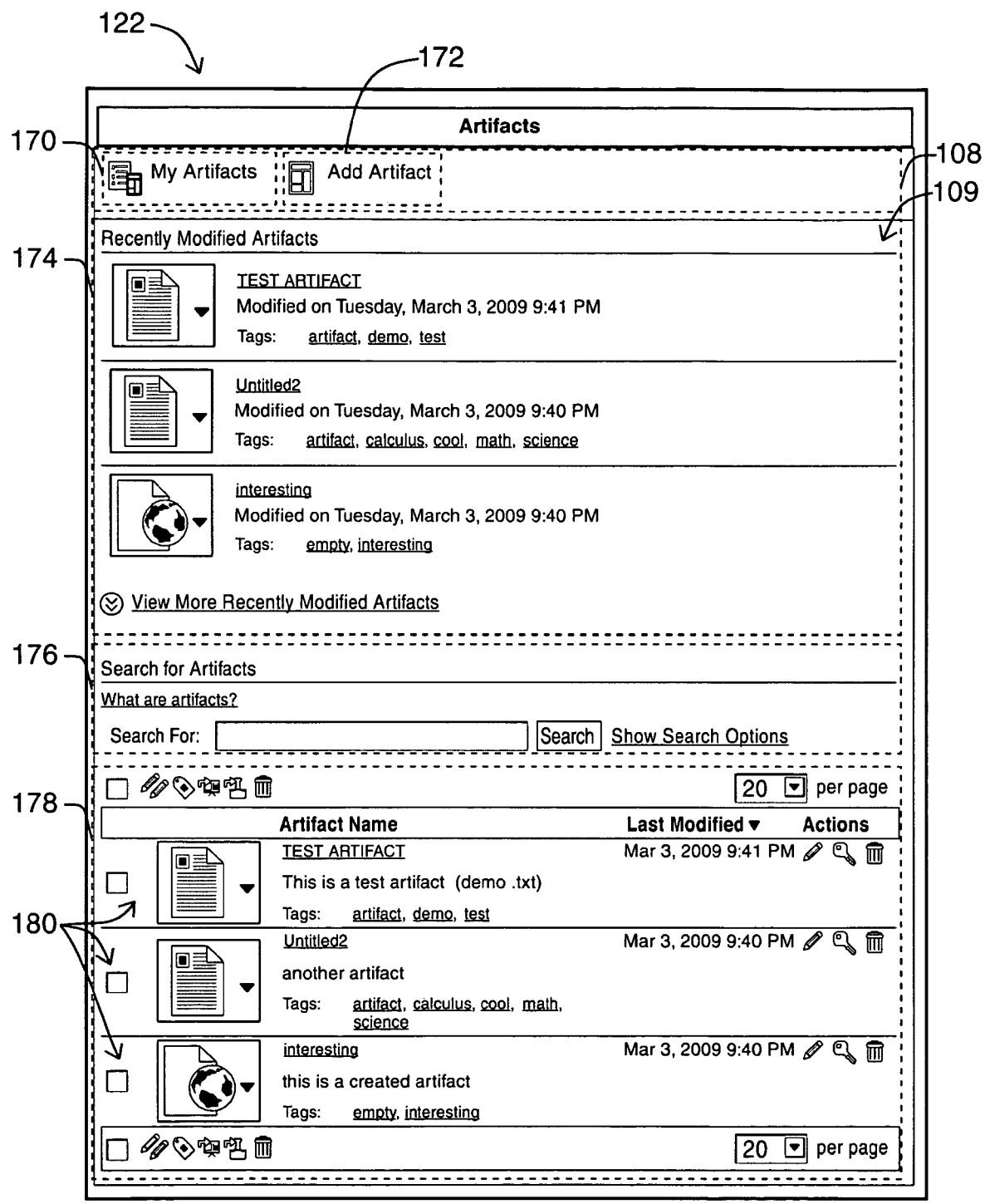
FIG. 8 is a screenshot of an artifacts management page for the system of FIG. 1A.

The navigation area 104 may also include an artifact button 120 associated with an artifact management page 122 (as generally shown in FIG. 8) and configured so that when the artifact button 120 is selected, the artifact management page 122 is displayed. The artifact management page 122 may allow users to manage the artifacts in their electronic portfolios 100 as will be described in further detail below. For example, the users may associate digital items with the electronic portfolio 100 by uploading or importing files, filling out forms, etc.

Figure 26:
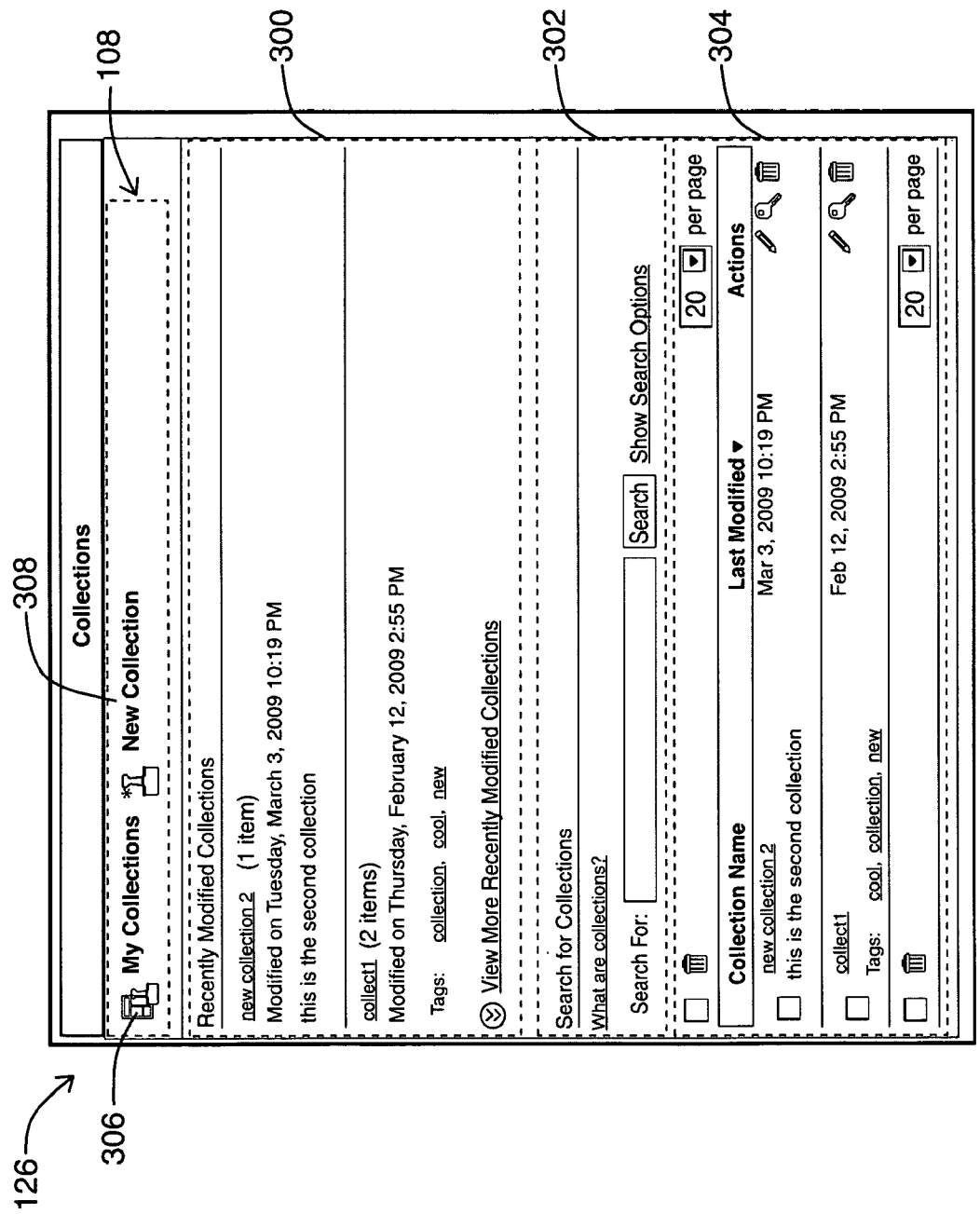
FIG. 26 is a screenshot of a collections management page for the system of FIG. 1A.

The navigation area 104 may also include a collections button 124 associated with a collections management page 126 (as generally shown in FIG. 26). The collections management page 126 may allow each user to collect and group digital items together, including, for example, artifacts, comments, reflections and presentations, both from their own electronic portfolio 100 and from the electronic portfolios of other users.

Figure 34:
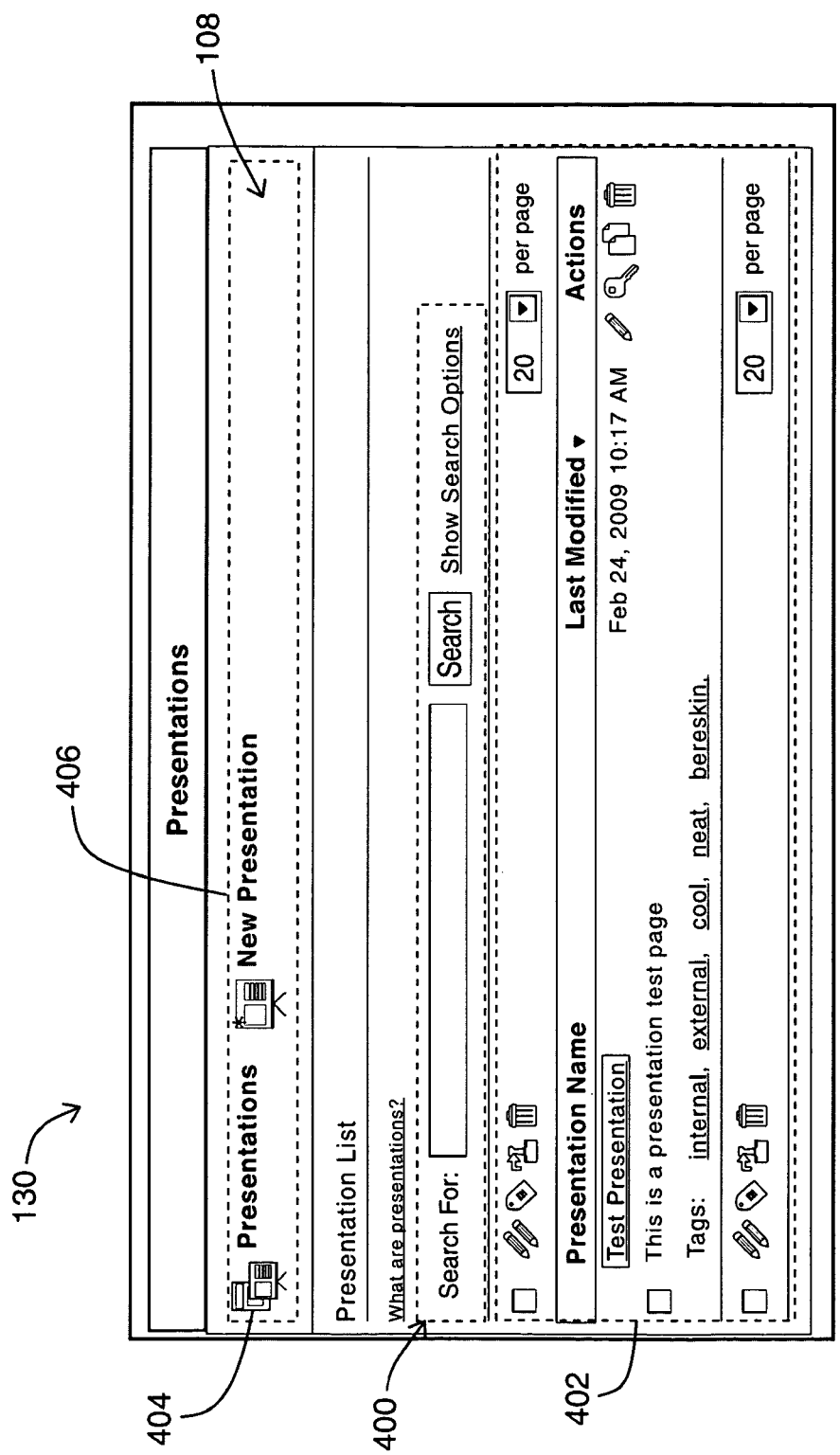
FIG. 34 is a screenshot of a presentations management page for the system of FIG. 1A.
Figure 36:
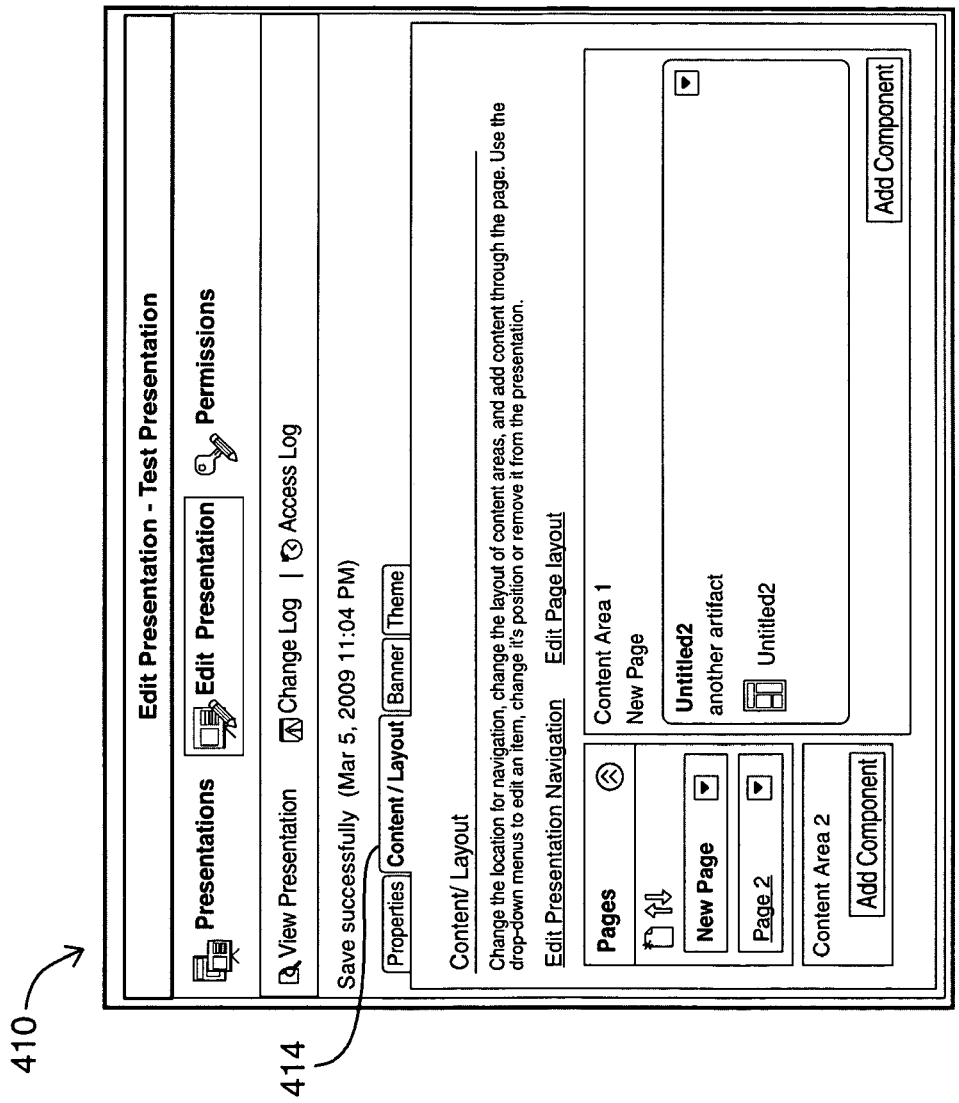
FIG. 36 is a screenshot of a presentations page for configuring the content/layout of a presentation.
Figure 37:
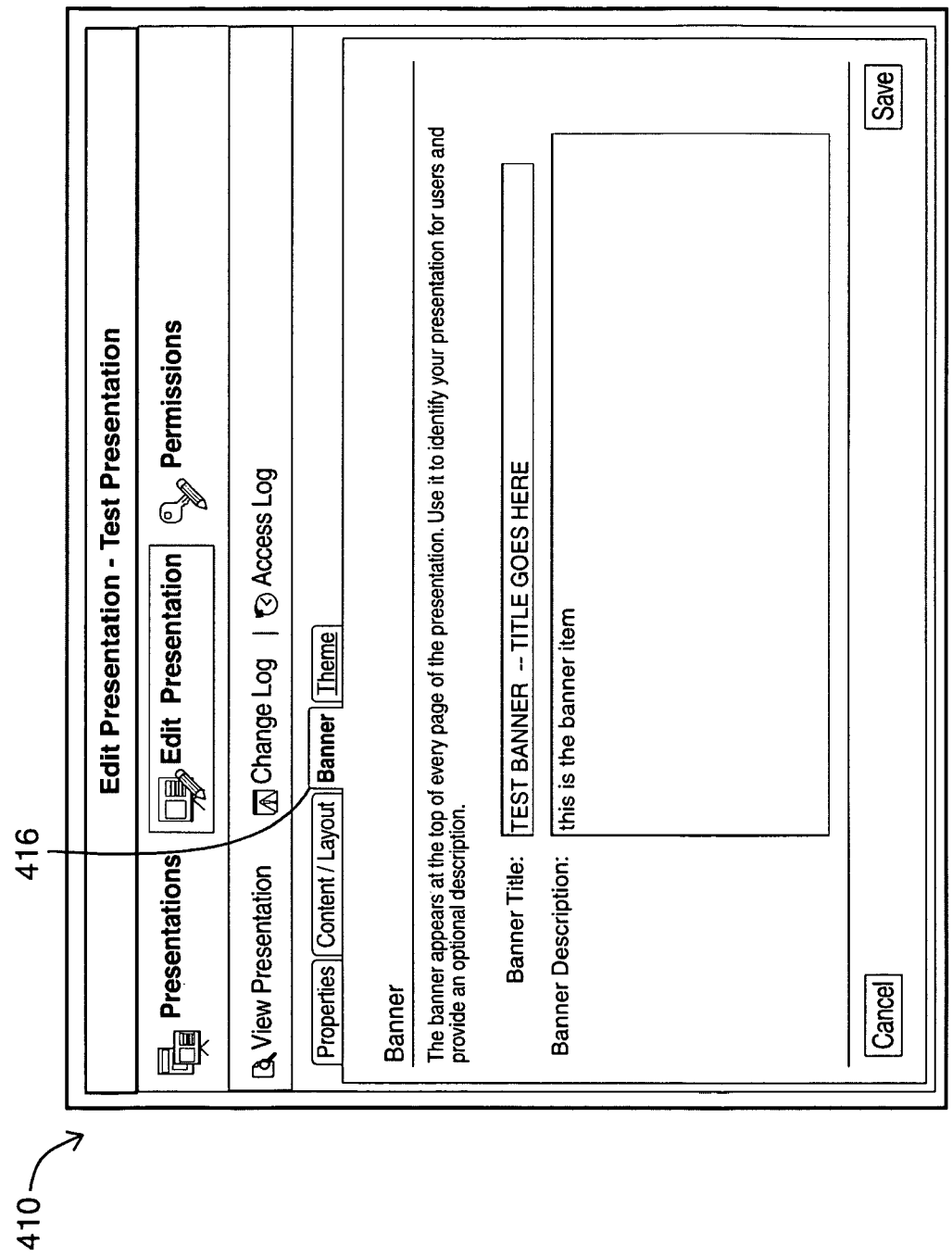
FIG. 37 is a screenshot of a presentations page for configuring the banner of a presentation.
Figure 38:
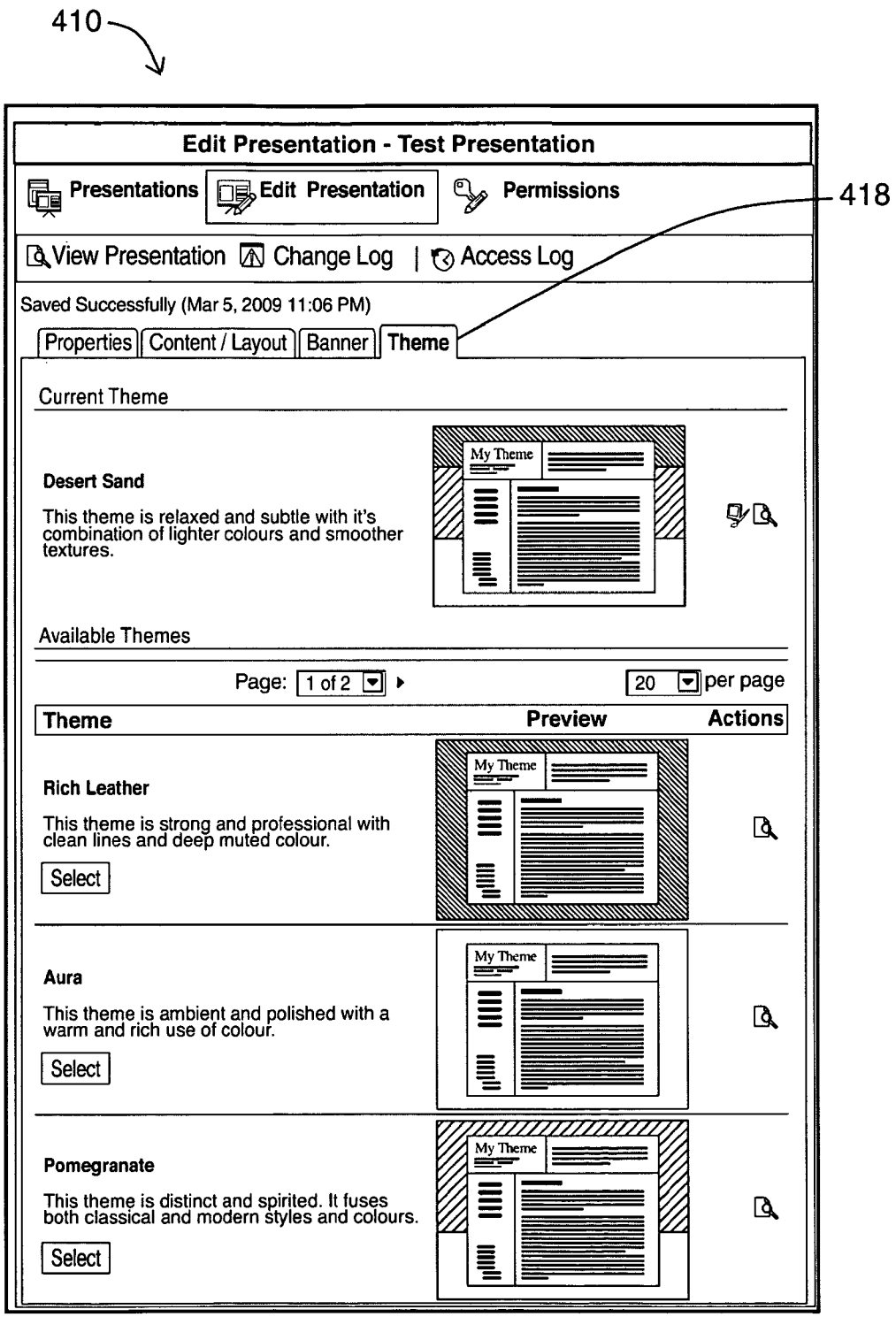
FIG. 38 is a screenshot of a presentations page for configuring the theme of a presentation.

The navigation area 104 may also include a presentations button 128 associated with a presentations page 130 (as generally shown in FIG. 34). The presentations page 130 may allow each user 12 to present digital items (e.g. artifacts, reflections, comments, etc.) to a defined set of users using presentations that include the digital items as page elements. The presentations page 130 may also allow presentations to be customized and personalized (e.g. by changing layouts, selecting different backgrounds, etc.)

Figure 39:
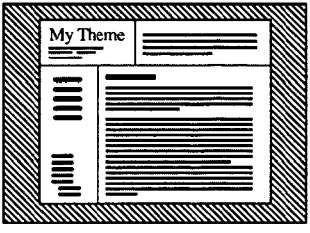
FIG. 39 is a screenshot of a themes management page for the system of FIG. 1A.

The navigation area 104 may also include a themes button 132 associated with a themes page 134 (as generally shown in FIG. 39). The themes page 134 may allow the user 12 to modify themes for use in the presentations, such as by changing page layouts, color schemes, etc.

Figure 40:
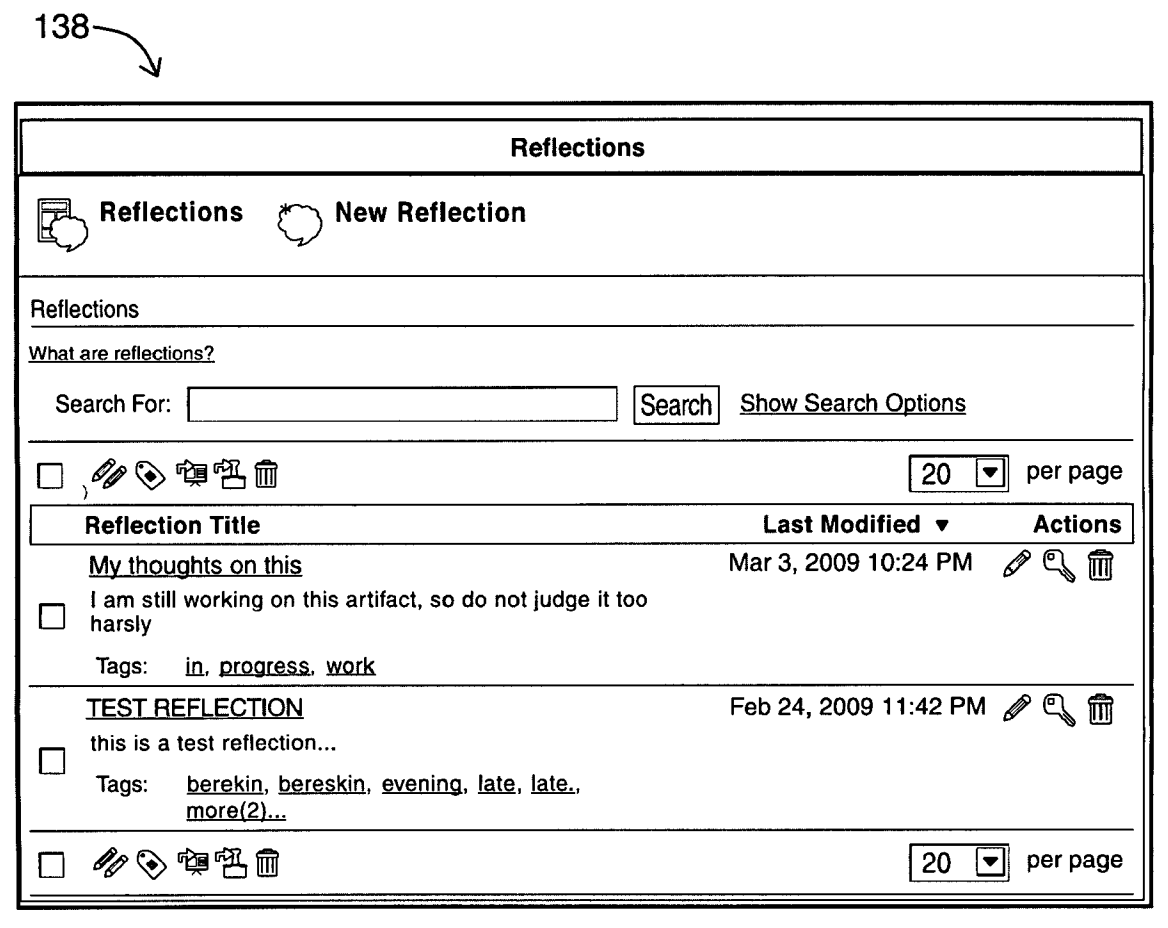

The navigation area 104 may also include a reflections button 136 associated with a reflections page 138 (as generally shown in FIG. 40). The reflections page 138 may allow each user to reflect on their own digital items, for example, and/or list personal thoughts and/or information about their goals. In some examples, one or more reflections may be associated with one or more digital items.

The navigation area 104 may also include a shared items button 140 that is associated with a shared items page 142 (as generally shown in FIG. 41). The shared items page 142 may allow users to see the items within their electronic portfolio that they are currently sharing with other users, and may also allow each user to see with whom (i.e. which other users) they are sharing items.

Figure 42:
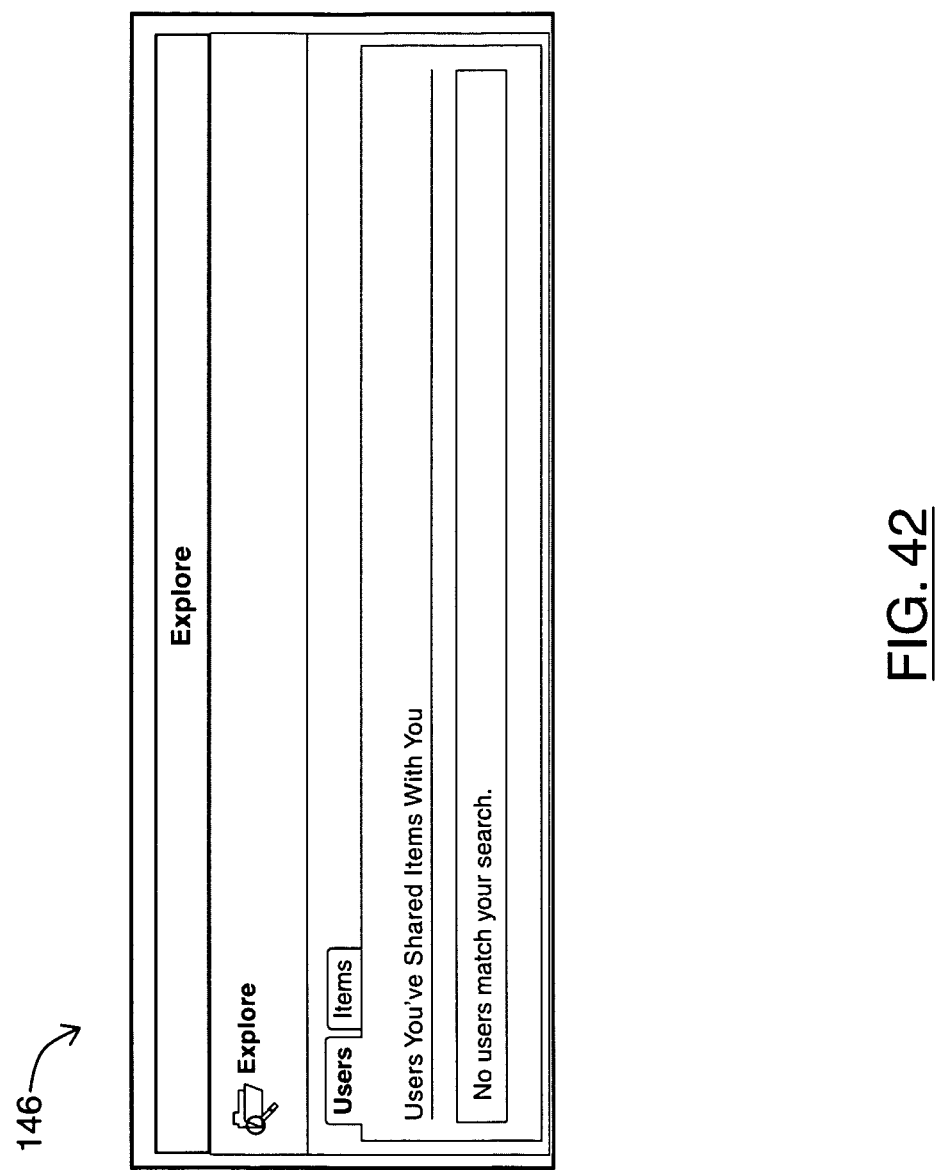
FIG. 42 is a screenshot of an exploring management page for the system of FIG. 1A.

The navigation area 104 may also include an explore button 144 associated with an explore page 146 (as generally shown in FIG. 42). The explore page 146 may allow each user to see what items from other users are currently being shared with them, as well as identify who among the other users are sharing items.

Figure 43:
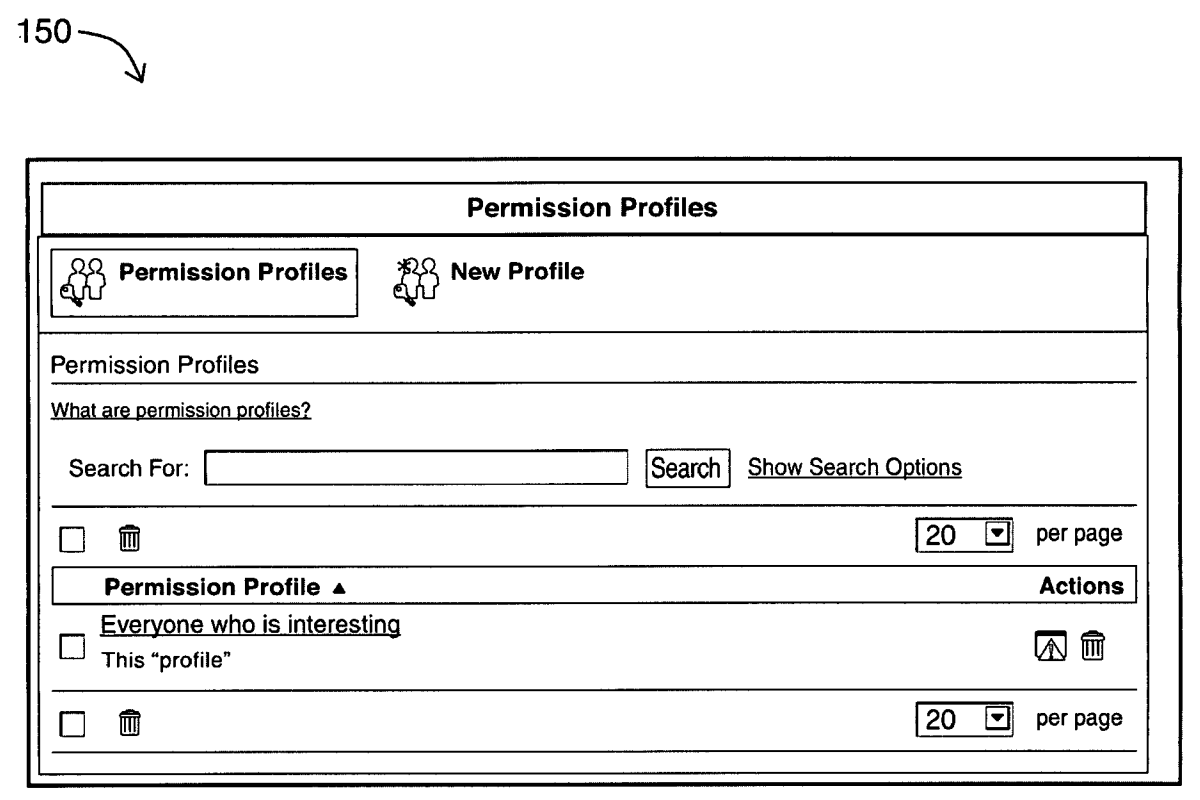

The navigation area 104 may also include a permissions button 148 associated with a permissions profiles page 150 (as generally shown in FIG. 43). The permissions profiles page 150 may allow each user 12 to see what permissions portfolios have been defined (either by them or by other users 14), as well as allow users 12, 14 to define new permission profiles and add or delete particular users from a permissions profile.

Figure 44:
FIG. 44 is a screenshot of a forms page for the system of FIG. 1A.

The navigation area 104 may also include a forms button (not shown in FIG. 2) that links to a forms page 260 (as shown in FIG. 44). The forms page may allow users to create customized forms that can be filled out by users and associated with one or more electronic portfolios 100 as digital items.

In some embodiments, the navigation area 104 generally remains in the same place and with the same content (e.g. buttons) as users navigate through the electronic portfolio 100, thus tending to provide a consistent user interface so that users can more easily navigate through the electronic portfolio 100. However, the content in the content area 109 is generally updated as the users move from page to page, and within sub-elements of each page.

For example, as shown in FIG. 2, when the home page 102 is displayed, the content area 109 can include a list of common tasks that a user may wish to perform. Generally, the home page 102 will be the first screen that a user sees when accessing the electronic portfolio 100. Accordingly, by presenting common tasks on the home page 102, users may be more quickly able to perform a desired action.

As also shown in FIG. 2, the home page 102 may include a welcome or introductory message (e.g. "Welcome to the ePortfolio" and the accompanying text, generally above the content area 109). In some examples, this welcome message may be static. In other examples, the welcome screen may be customized for each particular user, and/or may be updated to notify the user of various things (e.g. upcoming events, deadlines, reminders about tasks to complete, etc.)

Turning now to FIG. 3, illustrated therein is the dashboard page 118 as will be described in more detail. The dashboard page 118 tends to be a main source of information within the electronic portfolio 100, and includes a number of page elements, including additional areas that may not be present on the home page 102.

In particular, the dashboard page 118 may include the navigation area 104 and the content area 109, but may also include a profile area 106, and a toolbar area 108.

The profile area 106 may display a brief profile about the user or users that are associated with the particular electronic portfolio 100. For example, the profile area may include a profile picture, list the first and last name of a user associated with that electronic profile, display an email address for that user, and include a link that can be selected to display a more detailed profile. In embodiments where multiple users are associated with one electronic portfolio, the profile area 106 may display other information, such as a list of the users associated with the electronic portfolio (e.g. the members of a particular lab group, etc.).

The toolbar area 108 generally includes a plurality of links (which may be embodied as buttons) that are associated with various "sub-pages" or alternative pages associated with each particular page. Selecting the links or buttons from within the toolbar area 108 may change the particular content displayed in the content area 109.

For example, as shown, when the dashboard page 118 is active the toolbar area 108 includes a dashboard button 152 (and which when selected may load the dashboard page 118 shown in FIG. 3), a search button 154, an invites button 156, a "My Profile" button 158, and a settings button 160.

Figure 4:
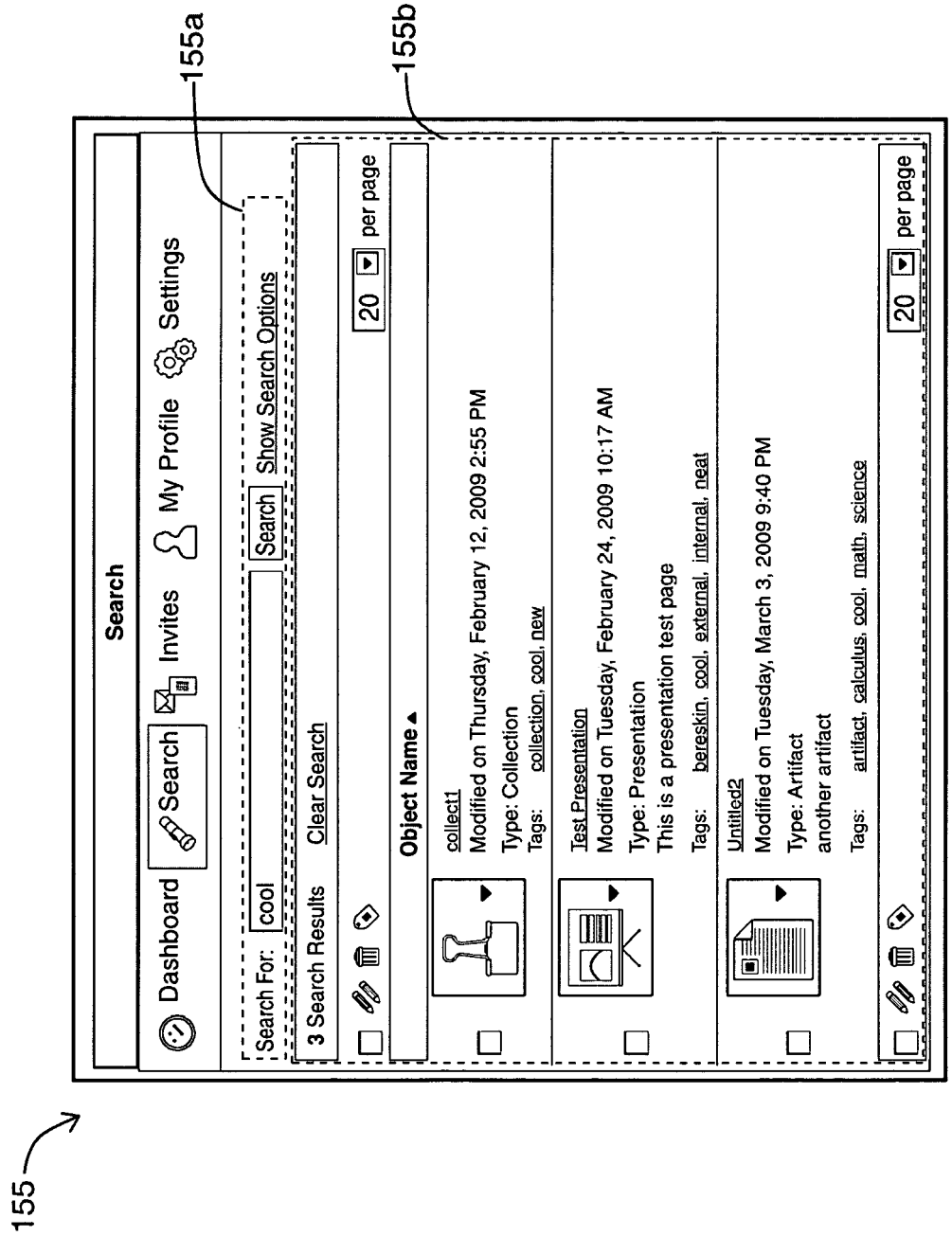
FIG. 4 is a screenshot of a search page for the system of FIG. 1A.

The search button 154 can load a search page 155 into the content area 109 (as generally shown in FIG. 4). The search page 155 has a search field 155$a$ which can allow users to enter keywords therein to search for various digital items (e.g. artifacts, collections and other objects), and may also have a results field 155$b$ that can display results from the search.

Figure 5:
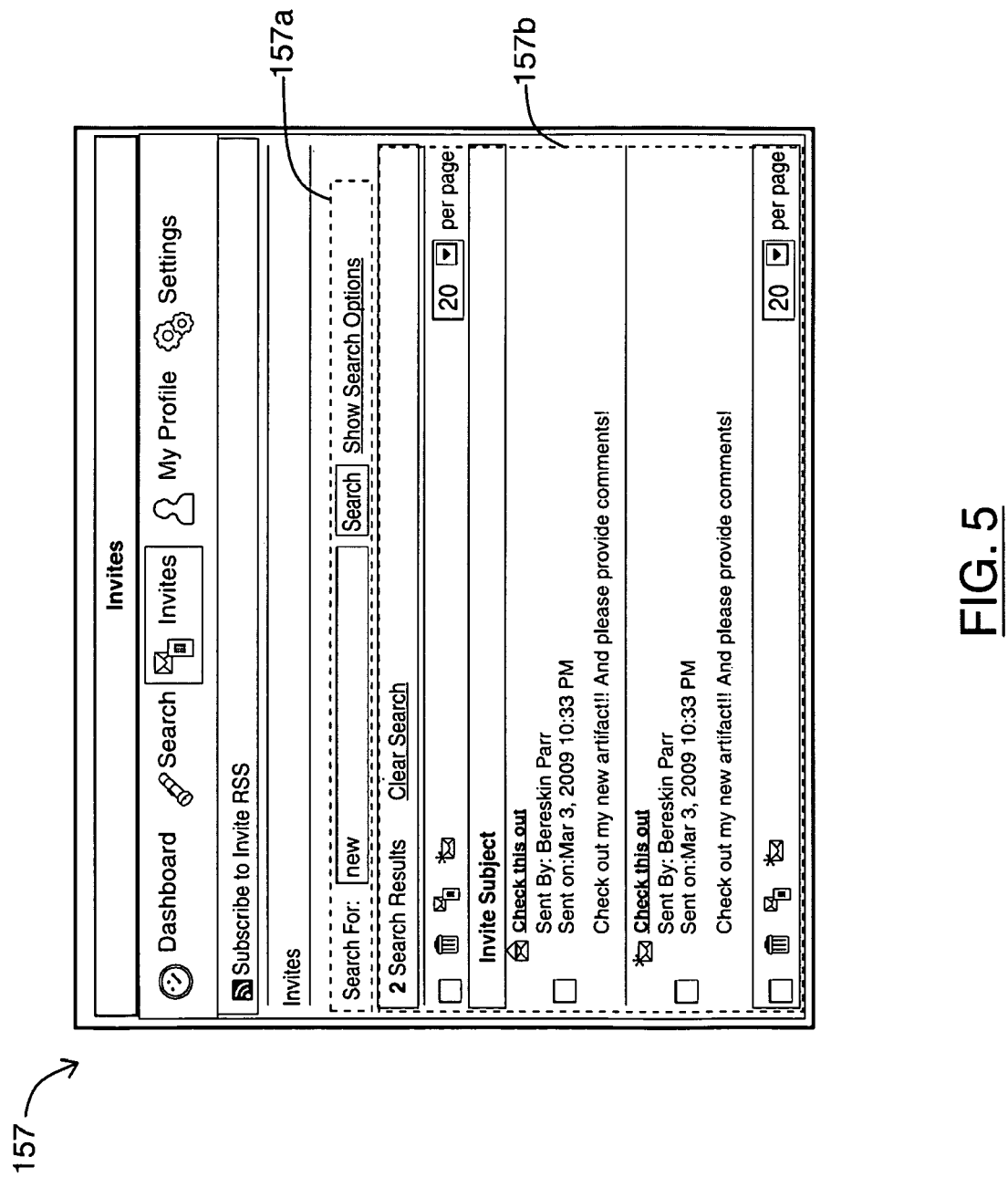
FIG. 5 is a screenshot of an invites page for the system of FIG. 1A.

The invites button 156 may display a search invites page 157 (as shown in FIG. 5). The search invites page 157 has a search field 157$a$ that allows user to search for any invites that they may have received, and which may show the resulting invites in a results field 157$b$. In some cases, the invites may be invitations to view and/or provide comments or assessments on digital items that other users have prepared.

Figure 6:
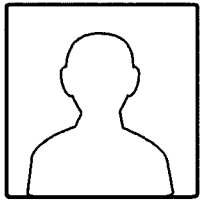
FIG. 6 is a screenshot of a profile editing page for the system of FIG. 1A.

The "My Profile" button 158 may load a profile page 159 (as generally shown in FIG. 6). The profile page 159 may allow users to configure their profiles, such as general information 159$a$ about the user (e.g. a profile picture, a nickname, birthday, hometown, and homepage), contact information 159$b$ (e.g. email, phone numbers, address information, etc.), education and work information 159$c$ (e.g. employer, schools attended, etc.), and other personal information 159$d$ (e.g. interests and hobbies, favorite music, books, etc.). The profile page 159 may also display system information 159$e$ (e.g. account name, organizational identification number, etc.) that generally cannot be configured by the user associated with that electronic portfolio 100 (but which, in some embodiments, may be configured by another user, such as the user 40).

In some examples, some of the information in the profile page 159 may be shown or displayed in the profile area 106 or in a full profile (not shown). In some examples, the user may also have the option of determining whether certain data may or may not be visible to other users (e.g. the user may not want to share birthday information, phone numbers, or address information).

In some embodiments, the personal profile for a particular user may be displayed to other users differently depending on at least one context. For example, if the other users are members of a particular logical group 18 (e.g. a lab group), then the users within that group may be more willing to share personal information. Similarly, certain users may be identified as having one or more levels of friendship, and the type and amount of information may be adjusted accordingly (e.g. close friends may be able to see personal information such as birthday information and contact info, while other types of friends may receive a restricted view of the profile). Furthermore, certain users (e.g. users who may be assessing the work of other users) may be presented with less personal information.

The settings button 160 may load a settings page 161 (as generally shown in FIG. 7) and which may allow each user to customize certain aspects of their electronic portfolio 100. In particular, the settings page 161 may allow users to change dashboard display options 161$a$ (e.g. what content 110, 112, 114 will be displayed in the content area 109 when the dashboard page 118 is displayed, and in what order will the content be displayed), default settings 161$b$ (e.g. will comments and/or assessments of digital items be allowed by default), invitation delivery methods 161$c$ (e.g. will invites be emailed), start page 161$d$ (e.g. will the home page 102 be the first page that is displayed or will another page be displayed), and default permissions profiles 161e (e.g. should a default permissions profile be used when digital items are uploaded or associated with the electronic portfolio 100, and/or should any default tags be applied, etc.).

Turning again to FIG. 3, the dashboard page 118 may display various content elements (and as may be customized using the default settings 161b) within the content area 109. For example, as shown the content area 109 in this example includes recent comments 110, recent invites 112, and recently modified items.

The recent comments 110 may include comments that have recently been associated with a particular digital item (e.g. an artifact) in the electronic portfolio 100. For example, as shown the recent comments include a comment on the digital item entitled "Peter's new Artifact".

The recent invites 112 may include invites that the user has recently received, in particular invitations to comment and/or assess digital items associated with other users' electronic portfolios. For example, as shown, the recent invites include at least two invitations to check out other digital items.

The recently modified items 114 may include digital items that the user has recently modified within their own electronic portfolio 100, and/or may contain digital items that other users have recently modified in other electronic portfolios. For example, as shown the recently modified items 114 include two collections (entitled "My Third Collection" and "new collection 2"), one artifact (entitled "Peter's new Artifact"), and one reflection (entitled "My thoughts on this").

In some embodiments, whether a particular comment, item or invite is considered "recent" may depend on various factors, such as the time elapsed since that object was created or last updated, as well as the amount of activity in a particular electronic portfolio (e.g. electronic portfolios with a lot of activity may characterize objects as "recent" for a shorter time period), and/or based on the length of time between system accesses by the user of that electronic portfolio.

Turning now to FIG. 8, the artifacts management page 122 is shown in further detail. For greater clarity, the navigation area 104 has been omitted from this figure, and the navigation area 104 may generally be provided to the left of the content area 109 in the artifacts management page 122 similar to the layout of the dashboard page 118.

As shown, on this page the toolbar area 108 may include two buttons, a "My Artifacts" button 170 and an add artifact button 172. The "My Artifacts" button 170 generally displays the content as shown in FIG. 8, while the add artifact button 172 may be used to add an artifact to the electronic portfolio 100 as detailed below.

As shown in FIG. 8, the content area 109 includes several page elements, including a recently modified artifacts area 174, a search field 176, and an artifact list 178.

Similar to the recently modified items 114 as described above, the recently modified artifacts 174 may display artifacts (as opposed to digital items more generally) that have recently been modified. In this example, three artifacts are displayed, entitled "TEST ARTIFACT", "Untitled2" and "interesting".

The search field 176 may allow users to search for particular artifacts, for example using meta-data associated with the artifacts (e.g. keywords or tags and/or other meta-data that may be associated with the artifacts, such as who created an artifact, or the date the artifact was created or last modified, etc.)

Finally, the artifact list 178 may display a list of some or all artifacts 180 associated with the electronic portfolio 100. To accommodate a large number of artifacts, the list may be broken into several sub pages through which users to navigate. As shown, the artifact list 178 generally includes three artifacts, entitled "TEST ARTIFACT", "Untitled2" and "interesting".

Generally, an artifact may be a base element in each electronic portfolio 100, and can represent objects such as a file, a learning environment object, and/or a form. In particular, artifacts may include, for example, Microsoft Word documents (or other word processing documents), Power-Point presentations, quiz attempts, discussion posts, dropbox folder submissions, completed forms, media files (e.g. movies, pictures, music), links to external files, documents, and generally any other type of digital file.

Once associated with a particular electronic portfolio, digital items (e.g. the artifacts or collections) can be organized and categorized, for example by using keyword tags or by creating collections as will be described in greater detail below.

Figure 9:
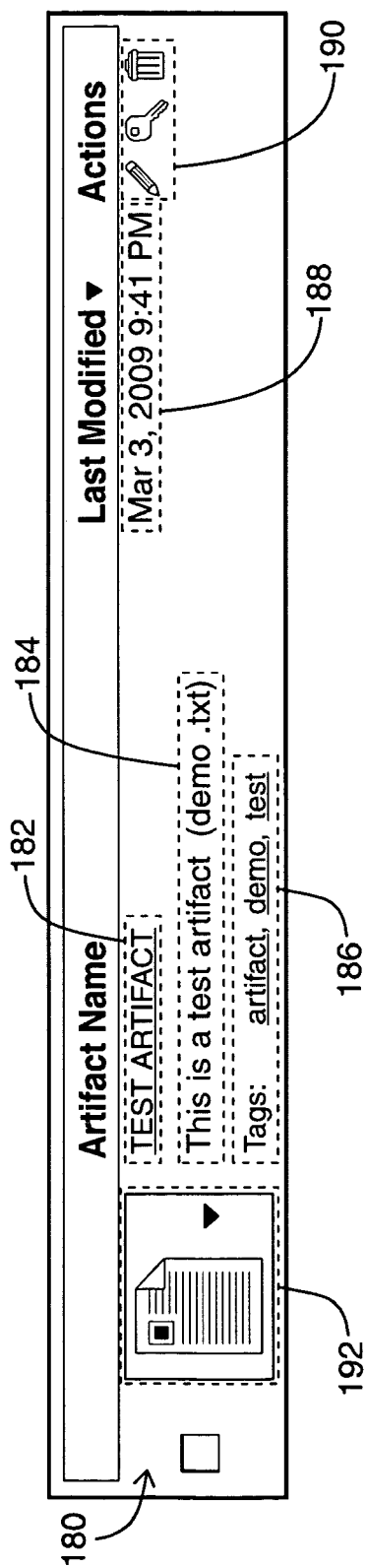
FIG. 9 is a detailed view of the artifacts management page shown in FIG. 7 showing information about an artifact.

As shown in FIG. 9, the artifact list 178 may display details about each particular artifact 180, such as the name of the artifact 182 ("TEST ARTIFACT"), a description 184 associated with the artifact 180 (and which may reference a filename associated with the artifact, for example "demo.txt"), various tags 186 or keywords that are associated with the artifact 180, audit details 188 (e.g. the date and time that the artifact 180 was last modified), actions 190 that can be performed on that artifact (e.g. edit the artifact, adjust the permissions profile for that artifact, and/or delete that artifact) and which may be activated by selecting icons in the actions 190 region, as well as an icon 192 that is associated with that artifact 180.

The icon 192 may be configured so as to quickly convey information about the artifact 180, such as by using different icons 192 for different artifacts 180. For example, the icon 192 may be configured to look like a document when the artifact 180 includes a word processing document (e.g. a .txt or .doc file), the icon 192 may look like a picture when the artifact 180 includes an image (e.g. a .jpg or .bmp file), and/or the icon 192 could also be a thumbnail view of the artifact 180, and/or external content stored in another website.

Turning now to FIGS. 8 and 10, when the user selects the add artifact button 172, an add artifact page 194 may be displayed as shown in FIG. 10. The add artifact page 194 may list various ways that an artifact can be added to or associated with a particular electronic portfolio 100.

For example, an artifact may be added by uploading a file (e.g. adding a file from the user's computer, locker or another location), creating a file (e.g. creating a new HTML file that may contain formatting, text, pictures, etc.), creating a link (e.g. using a URL to reference an object in existence on a website, and which may be remote from and external to the system 10), importing a file (e.g. by importing results from a particular course, such as quiz results, dropbox feedback, grades for the user, progress indicators, etc.), and/or by filling out a form (e.g. completing a form presented through one of the courses that the user is enrolled in).

Figure 11:
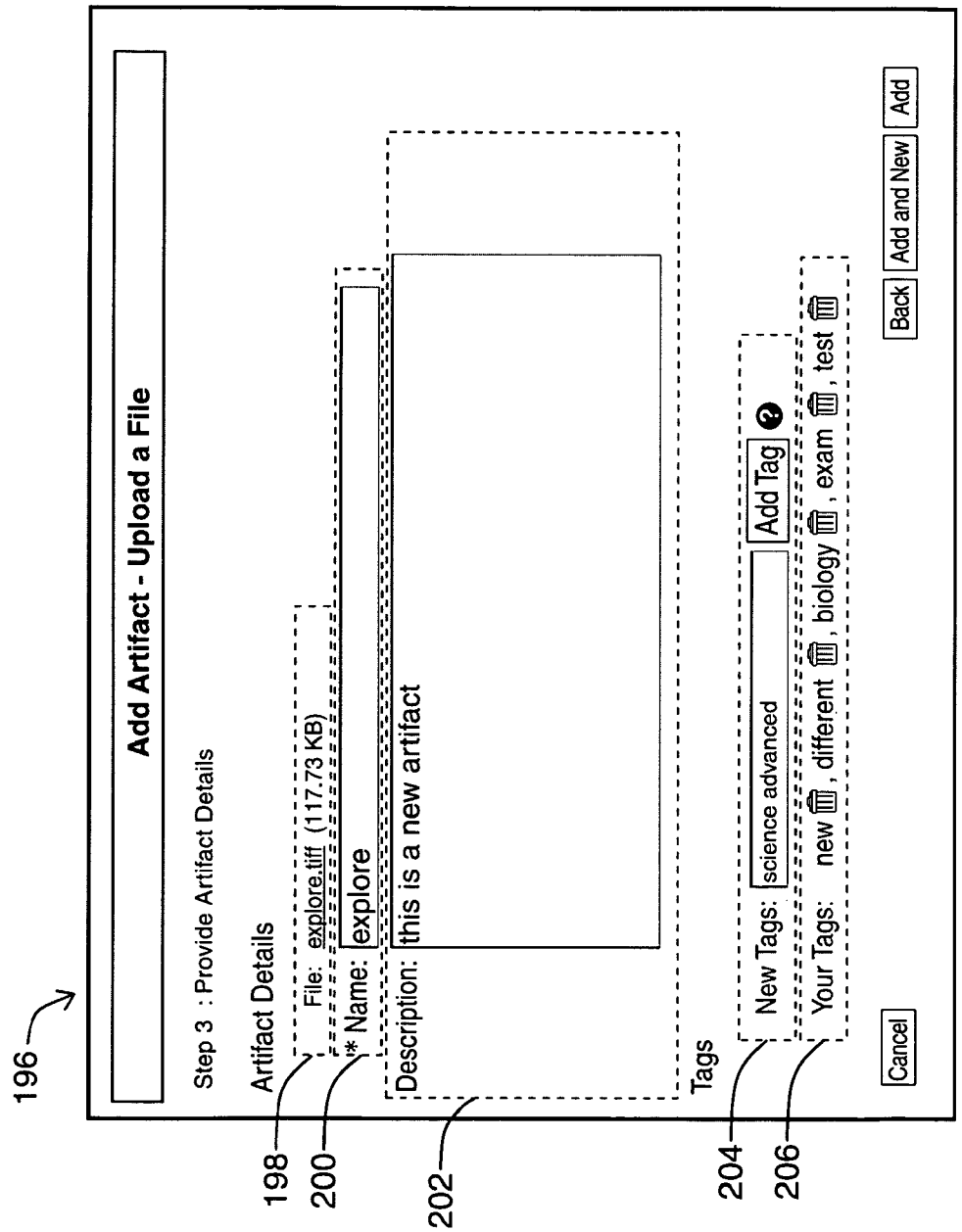
FIG. 11 is a screenshot of a file upload page for the system of FIG. 1A.

As shown in FIG. 10, for example, a user may choose to associate an artifact with the electronic portfolio by uploading an existing file using an upload file page 196 (which may be activated by selecting the appropriate link on the add artifact page 194). As shown in FIG. 11, the upload file page 196 may include the name and/or path of the file 198 to be uploaded (which may be selected using a conventional dialog box as is generally known), a display name 200 that may be entered by the user and which will be displayed within the electronic portfolio 100 in association with that artifact (and which may help decipher the identity of the artifact, particularly where the file name 198 is especially cryptic), a description 202 of the artifact (which may be entered by the user), and one or more tags 206 (e.g. at least one keyword) associated with the artifact.

In some examples, at least some of the keywords or tags 206 may be predefined, and may be selected by the users (e.g. using a drop down box or pick list). In other examples, the keywords or tags 206 may be dynamically defined, for example by entering text in a free format in a textbox 204.

Generally, the servers 32 in the system 10 may be configured such that users may perform keyword searches across electronic portfolios, and receive results (e.g. digital items identified to the users) based on the meta-data (e.g. tags or keywords) associated therewith. This can allow users to discover not only digital items of which they were already aware (e.g. their own artifacts or artifacts of their friends) but also digital items about which that particular user was previously unaware. For example, when digital artifacts are added to the plurality of electronic portfolios in the system 10, keyword searching may return digital items added by other users (in particular unknown users) where there is similarity or a match in the tags.

Once the artifact has been associated with the electronic profile 100, then the user may be able to configure the artifact using a configuration page 208 (as generally shown in FIG. 12).

For example, the edit artifact page 208 may display and allow editing of the artifact details 210 (including the name, description and particular file in the artifact) and tags 212 associated with the artifact. The edit artifact page 208 may also allow settings 214 for that artifact to be modified (e.g. will comments and/or assessments of digital items be allowed), and rubrics to be associated therewith (e.g. using the add rubrics page 220 as shown in FIG. 13). In some examples, the settings may default according to the default settings 161b generally as described above.

The edit artifact page 208 may also include presentation information 216 (e.g. a reference to presentations that contain this artifact and/or allow this artifact to be added to presentations) and collection information 218 (e.g. a reference to collections that contain this artifact and/or allow this artifact to be added to collections).

As shown in FIG. 13, the add rubrics page 220 may allow users to select rubrics 220b (while leaving other rubrics unselected 220a) to be associated with a particular artifact (or another digital item). Generally, rubrics may assist when assessing digital items by providing guidance to the user performing assessment on that digital item, and may provide a reference for users who are submitting digital items for assessment so that they can better understand how they will be evaluated.

In some embodiments, at least one of the digital items is an assignment item prepared by a first user (or one or more first users) and which is presented to a second user (or one or more second users) for assessment. The assessment of the assignment item may be performed using one or more rubrics. In some cases, after each assignment item is submitted for assessment, that assignment item may be locked against subsequent changes (e.g. the first user can no longer make changes to that version while they are waiting for assessment feedback).

For example, the assignment item could be prepared in response to an examination, and may include answers to questions presented on the examination. Accordingly, the first user may not be able to change answers after submitting the response for assessment (otherwise the first user may be able to cheat, and/or the users performing the evaluation may be inconvenienced by having the content of the assignment change during the evaluation).

In some cases, it may be beneficial if particular questions in an examination can be reused. Accordingly, the assessment of a particular response to an examination may be returned to the first user without the plurality of questions attached thereto (so that the response cannot be used as an answer key). More generally, each assessment of an assignment item may be returned to the first user only with data that the second user has determined is acceptable or should be returned to the first user.

Figure 14:
FIG. 14 is a screenshot of the details of an artifact showing a reflection, a comment, and an assessment.

Turning now to FIG. 14, the completed artifact may be displayed using a view artifact page 222. The view artifact page 222 may display various actions 224 that can performed on the artifact (e.g. open artifact, edit artifact, download, delete, add to presentation, add to collection, edit tags, and view associated collections and/or presentations).

Figure 15:
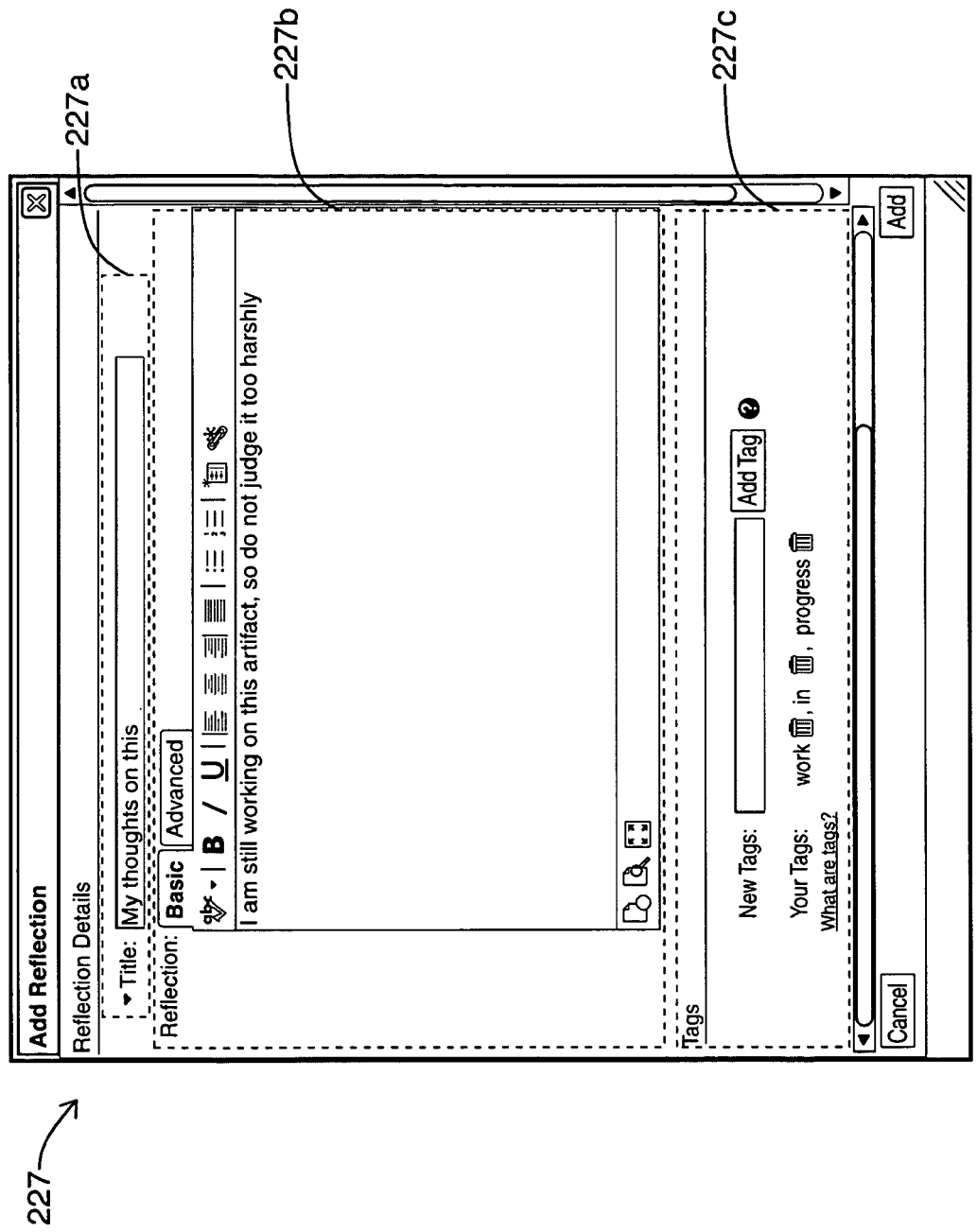
FIG. 15 is a screenshot of an add reflection page for the artifact shown in FIG. 14.

The view artifact page 222 may also allow the user who uploaded that particular artifact to post reflections 226 associated with that artifact, which may be personal thoughts of the user. For example, as shown in FIG. 15, reflections 226 may be added using an add reflections page 227, which may allow a particular reflection to have a title 227a, comments 227b (which may include text, html, links, etc.), as well as tags 227c.

Figure 16:
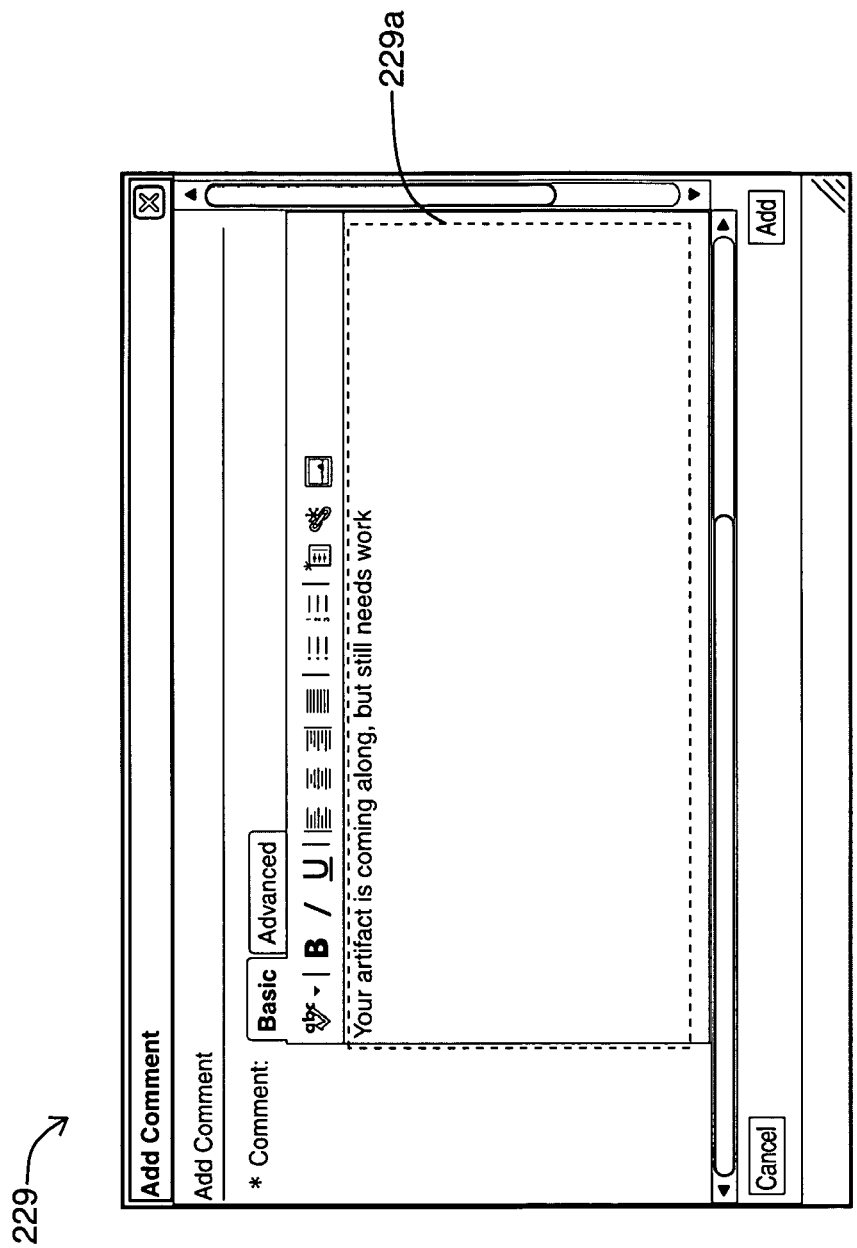
FIG. 16 is a screenshot of an add comment page for the artifact shown in FIG. 14.

The view artifact page 222 may also allow the user and/or other users to provide comments 228 about the artifact. For example, as shown in FIG. 16, an add comments page 229 may allow general comments to be made on topics such as the content or quality of the artifact, or generally any other topic using a comment field 229a (and which may include text, html, links, etc.).

Finally, the view artifact page 222 may also allow users to provide an assessment 230 of the artifact. For example, as shown in FIG. 17, an add assessment page 231 may allow users to select one or more rubrics 231a (which may correspond to the rubrics added using the add rubrics page 220) and to select a particular evaluation level 231b for that artifact based on the selected rubric 231a.

Generally, actions that users may take on particular digital items (e.g. artifacts, collections, etc.) may depend on various authorization criteria. For example, authorization criteria may include at least one global configuration profile associated with the plurality of electronic portfolios in the system 10. One example global configuration profile may control or limit whether public access to the system 10 (e.g. by public users 50) is allowed, and/or if allowed, what authentication steps may be required. Another global configuration profile could relate to what modules may be available to particular users (e.g. whether particular components of the system, such as the presentation module, have been purchased and/or installed).

In some embodiments, the authorization criteria may include at least one security profile associated with at least one role, each role including at least one of the plurality of users.

In some embodiments, the authorization criteria may include at least one permission-specific criteria, such as whether users are enrolled in particular courses.

Figure 18:
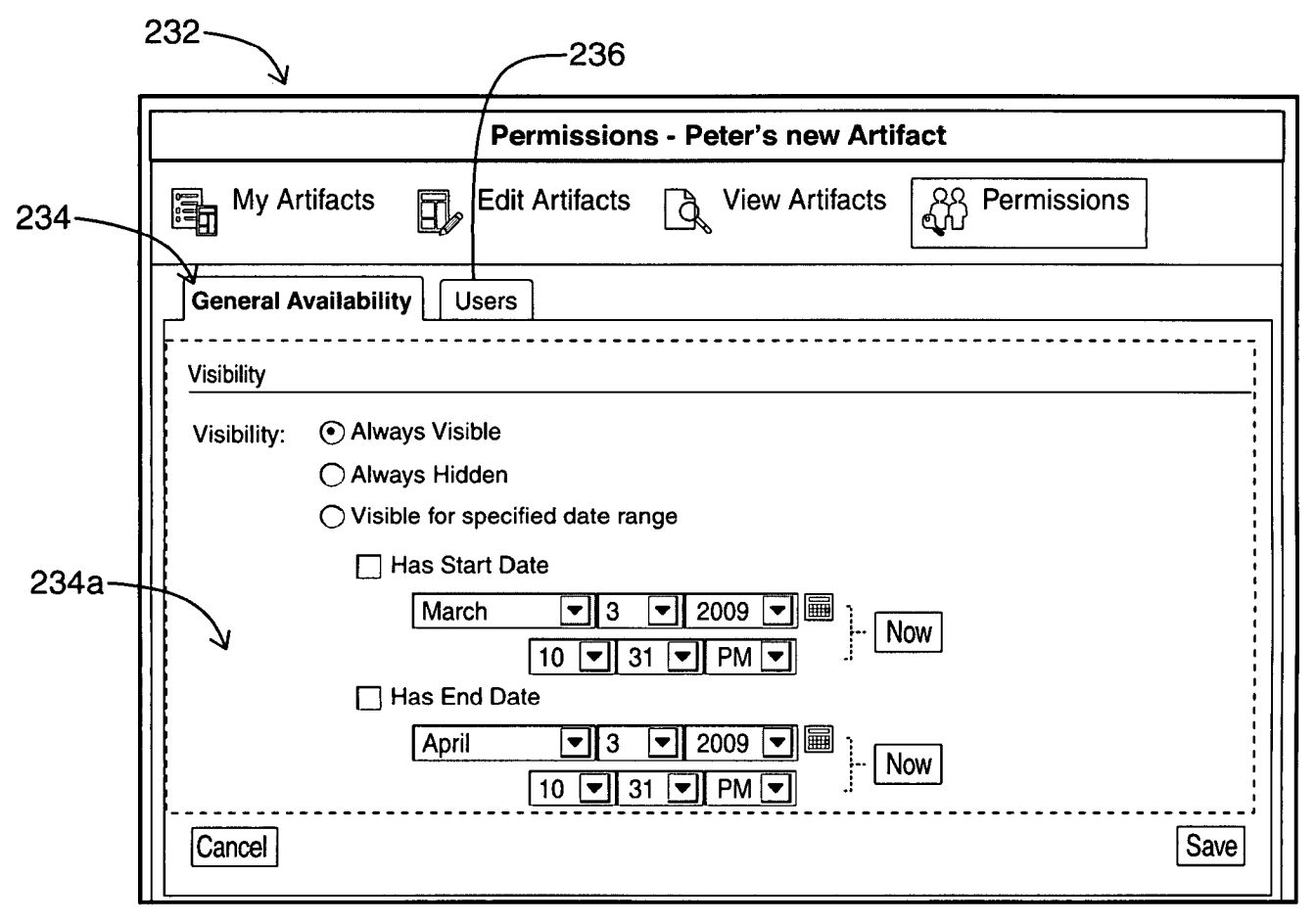

As shown in FIG. 18, the authorization criteria may include at least one permission profile associated with at least one digital items. For example, using a permissions profile page 232 for a digital item (e.g. a particular artifact), a particular user may be able to set at least one of general availability criteria 234 and user specific access criteria 236 for that artifact.

The general availability criteria 234 may include setting visibility criteria 234a for that artifact, such as whether the artifact is always visible to other users, is always hidden to other users, or is visible only for a particular period of time (e.g. during a specific date range). Whether a particular digital item (e.g. an artifact) is visible may limit whether other users can actually view the digital item, and/or may affect whether the digital item can be located when the other users perform a search.

As shown in FIG. 19, in some embodiments, the users may set user specific access criteria 236 for each artifact, which may include access criteria based on permissions profiles 236a and/or based on individual users 236b.

For example, as shown in FIG. 20, one or more permissions profiles 236a may be selected for a particular artifact, and in some cases (as shown in FIG. 21), users within that profile may be sent an invitation 238 to view and/or perform other actions on that artifact.

Furthermore, permissions may be determined based on individual users 236b. For example (as shown in FIG. 22), one or more individual users may be added to the permissions profile using a pick course page 240, which may allow one or more courses to be selected (e.g. using a search field 242 or a list 244) in which users are enrolled, and then (as shown in FIG. 23), particular users 248 within the selected course(s) can be added using an add users page 246.

Furthermore, as shown in FIG. 24, generally the permissions for all users that were added at the add users page 246 may be configured using a permission page 252, which can control or limit the actions that those users can take on that artifact. For example, users may be provided with permission to take some or all of the following actions: view artifact, see comments from others, add comments, see assessments from others, add assessments, and edit artifact.

Users can choose to allow or deny comments and/or assessments for digital items, including whether comments and assessments can be viewed or added for specific users as desired.

Figure 25:
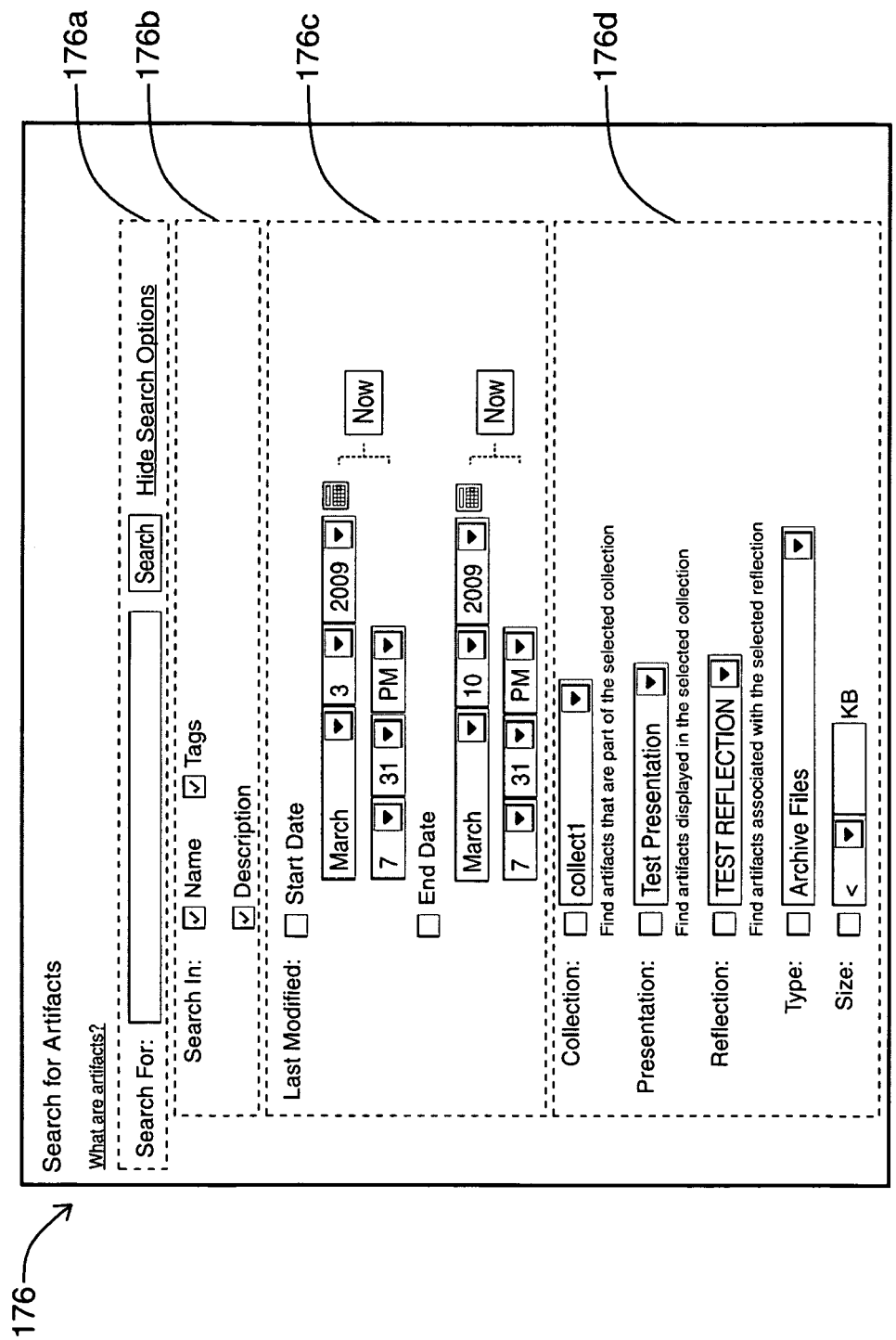
FIG. 25 is screenshot of a search page for searching for artifacts.

Turning now to FIG. 25, the search field 176 as introduced above will be described in greater detail. As mentioned above, the search field 176 may allow users to search for particular artifacts, for example using meta-data (e.g. keywords or tags) associated with the digital items (e.g. artifacts, collections, and/or other meta-data that may be associated with the digital items, such as who created a digital item, date the digital item was created or last modified, etc.)

As shown in FIG. 25, in addition to searching by entering keywords 176a, the search field 176 may be expanded to include various search options, such as limiting the general scope of meta-data searched 176b, adding date and/or time criteria 176c, as well as other search limitations 176d (such as searching within specific collections, specific presentations, and/or specific reflections, based on certain file types, and/or file sizes, etc.).

Turning now to FIG. 26, the collections management page 126 will now be described in greater detail. A collection is another instance of a digital item (like an artifact), and generally all manipulations that can be performed in respect of artifacts (as described above) can be performed on other digital items, including collections.

Each collection allows one or more users to collect and group one or more digital items together, including artifacts, comments, reflections, assessments, and/or presentations. In some cases the digital items in a collection may be local digital items taken from their own electronic portfolio 100 and/or remote digital items from the electronic portfolios of other users or from outside the system 10.

As shown, the collections management page 126 may display various elements within the content area 109, including recently modified collections 300 (which may be generally similar to recently modified artifacts 174 as described above), a search field 302 for searching for collections (which may be generally similar to the search field 176 for searching artifacts as described above), and a collection list 304 (which may be similar to the artifact list 178 as described above).

As shown, when the collections management page 126 is displayed, the toolbar area 108 may include a "My Collections" button 306 (and which generally presents the collections management page 126 as shown in FIG. 26), and a new collection button 308.

Figure 27:
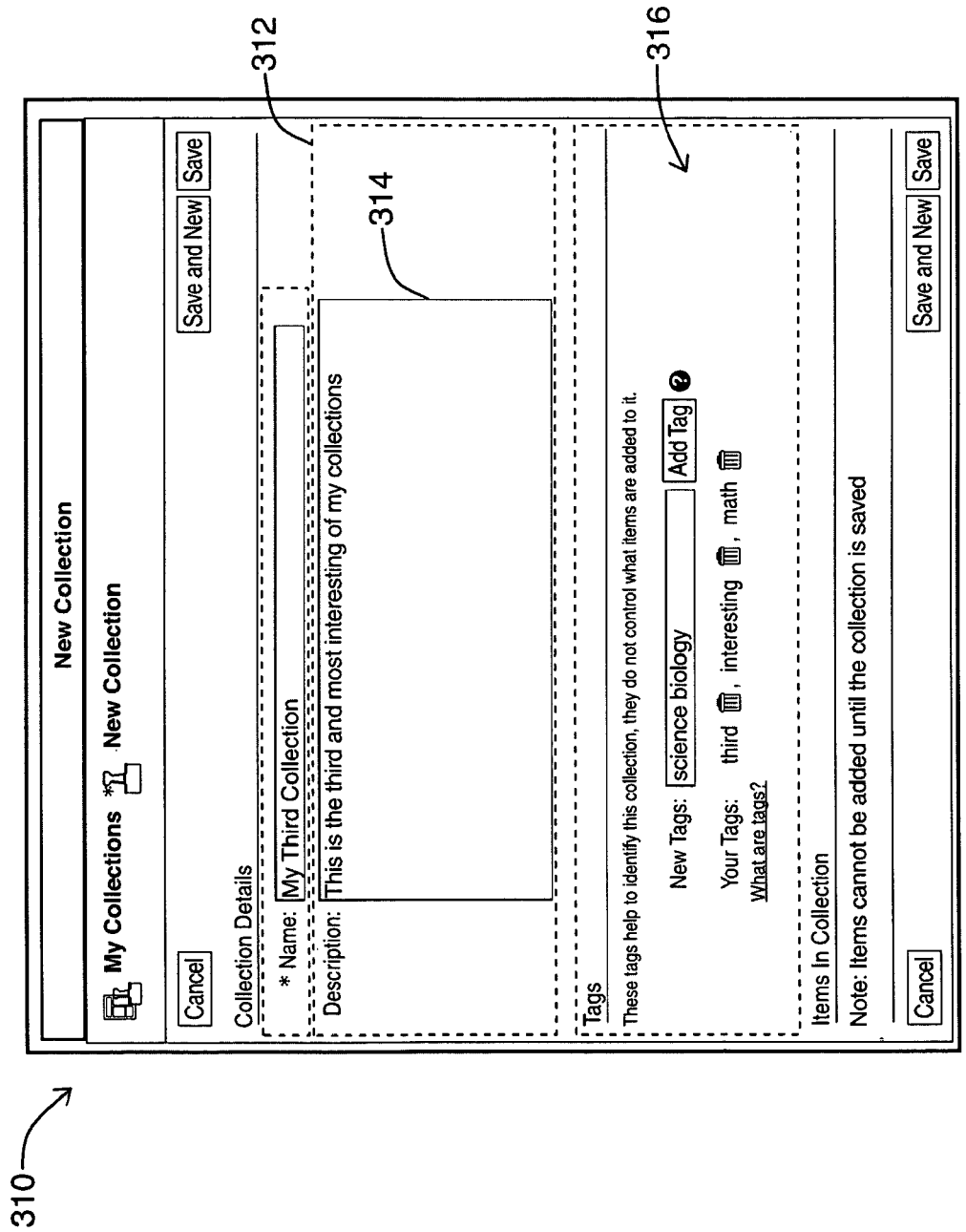
FIG. 27 is a screenshot of the collections management page of FIG. 26 showing a new collection being added.

When the new collection button 308 is selected, a new collection page 310 may be displayed (as shown in FIG. 27). Adding a new collection is generally similar to adding a new artifact, and may allow for a user-defined title 312, a description 314, and tags 316 to be associated with that collection.

Figure 28:
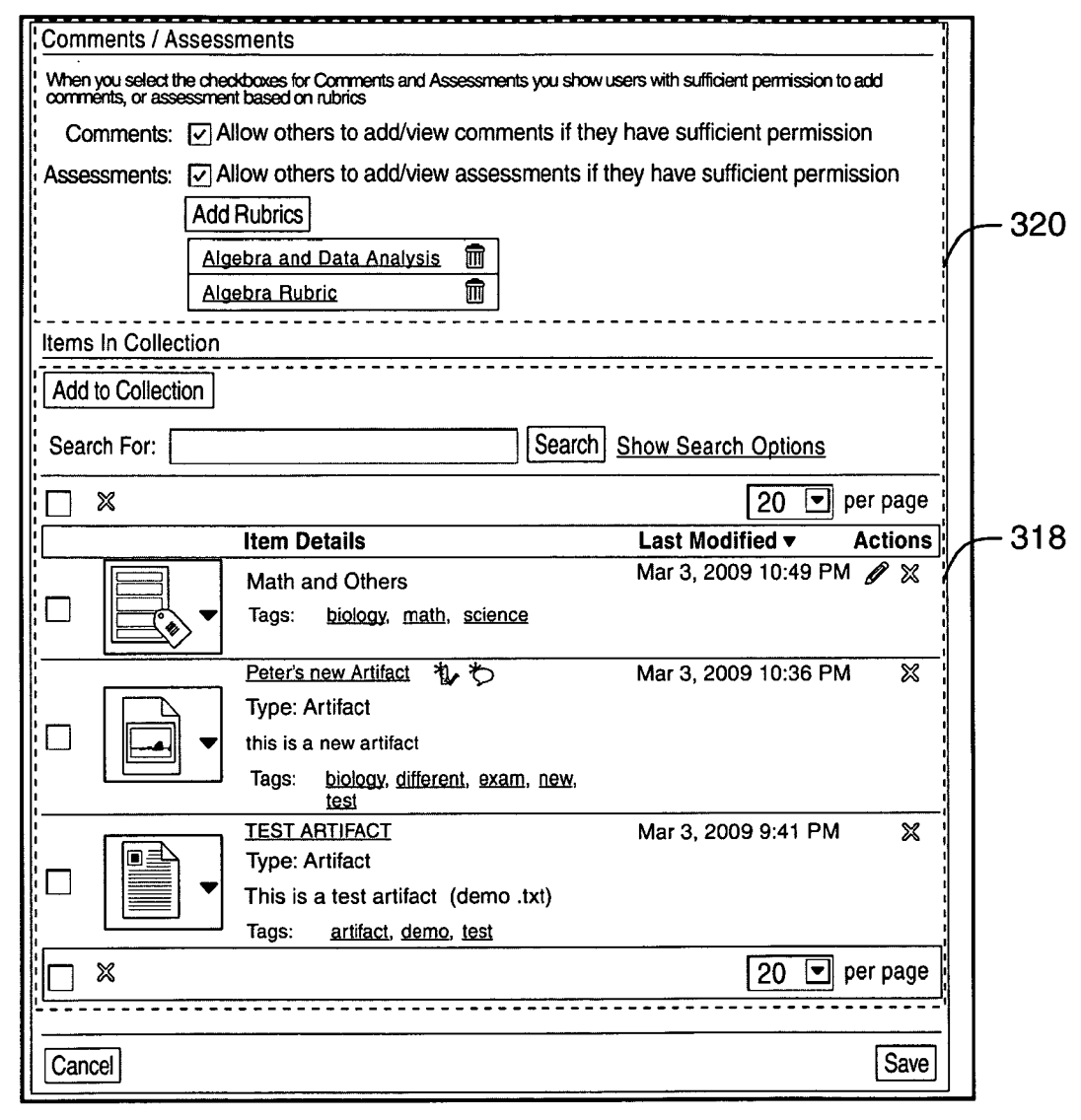

Once created (e.g. by saving the new collection), the new collection page 310 may expand to allow digital items to be added to the collection 318 (and/or may list digital items that have already been added thereto). The new collection page 310 may also allow the collection to be customized to receive comments and/or assessments 320 (as shown in FIG. 28).

Figure 29:
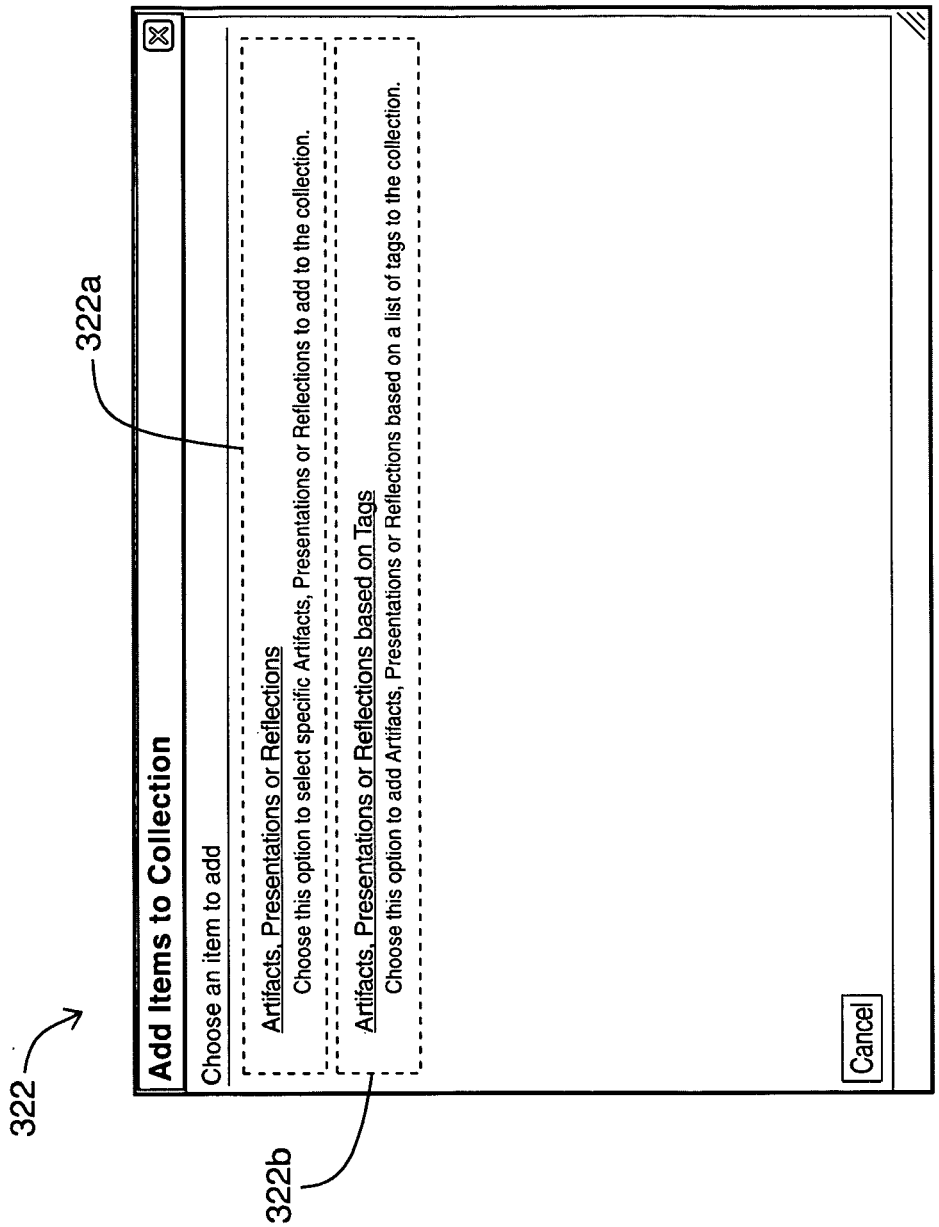
FIG. 29 is a screenshot of an add items page for adding items to the collection of FIG. 27.
Figure 30:
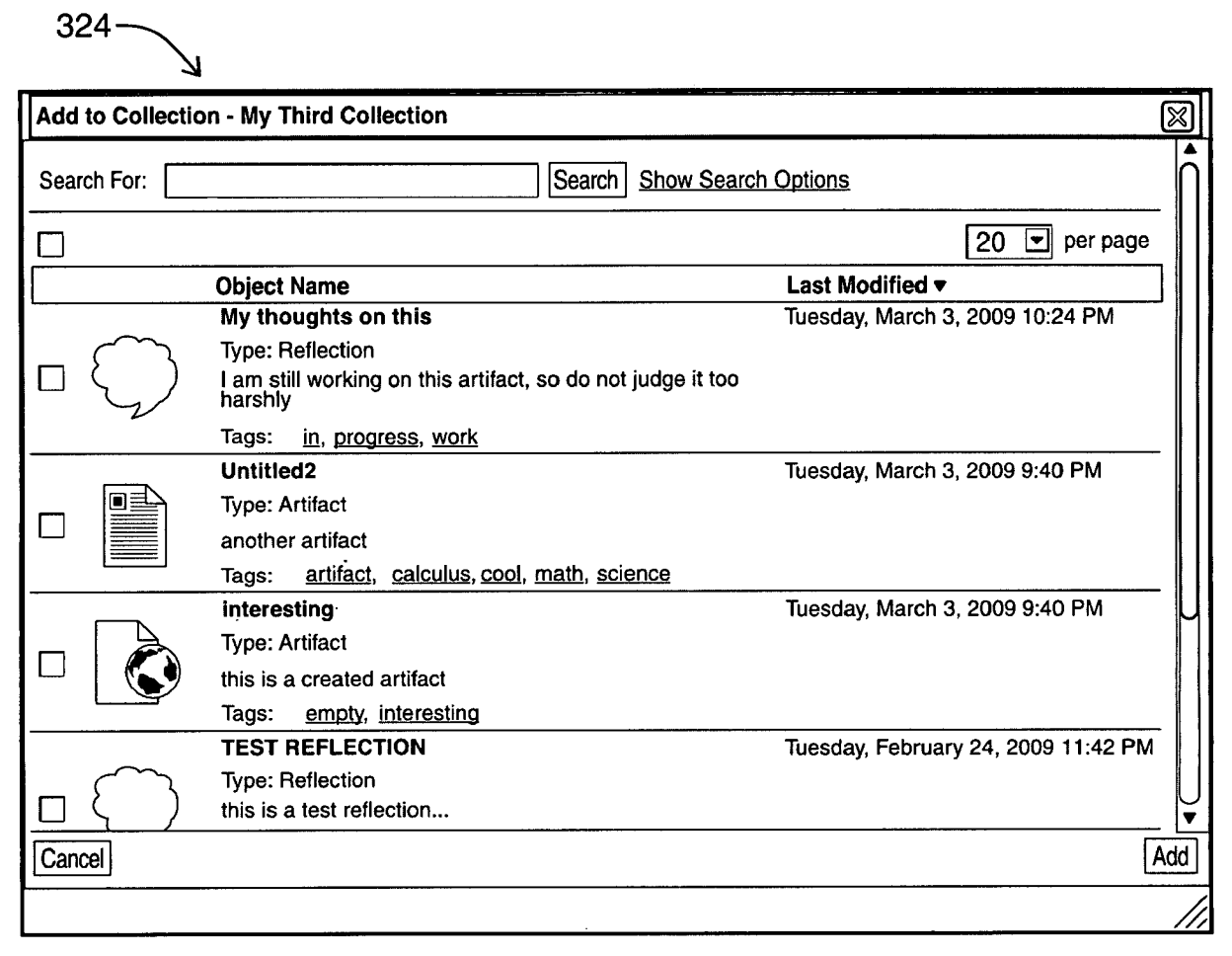

In some embodiments (as shown in FIG. 29), at least one digital item (e.g. a plurality of artifacts) may be added to the collection based on a manual selection of digital items (e.g. by selecting the link 322a on the add items page 322 to load the add to collection page 324 as shown in FIG. 30). Using the add to collection page 324, users may search for particular digital items to add, and then manually select the desired items to add them to the collection.

Figure 31:
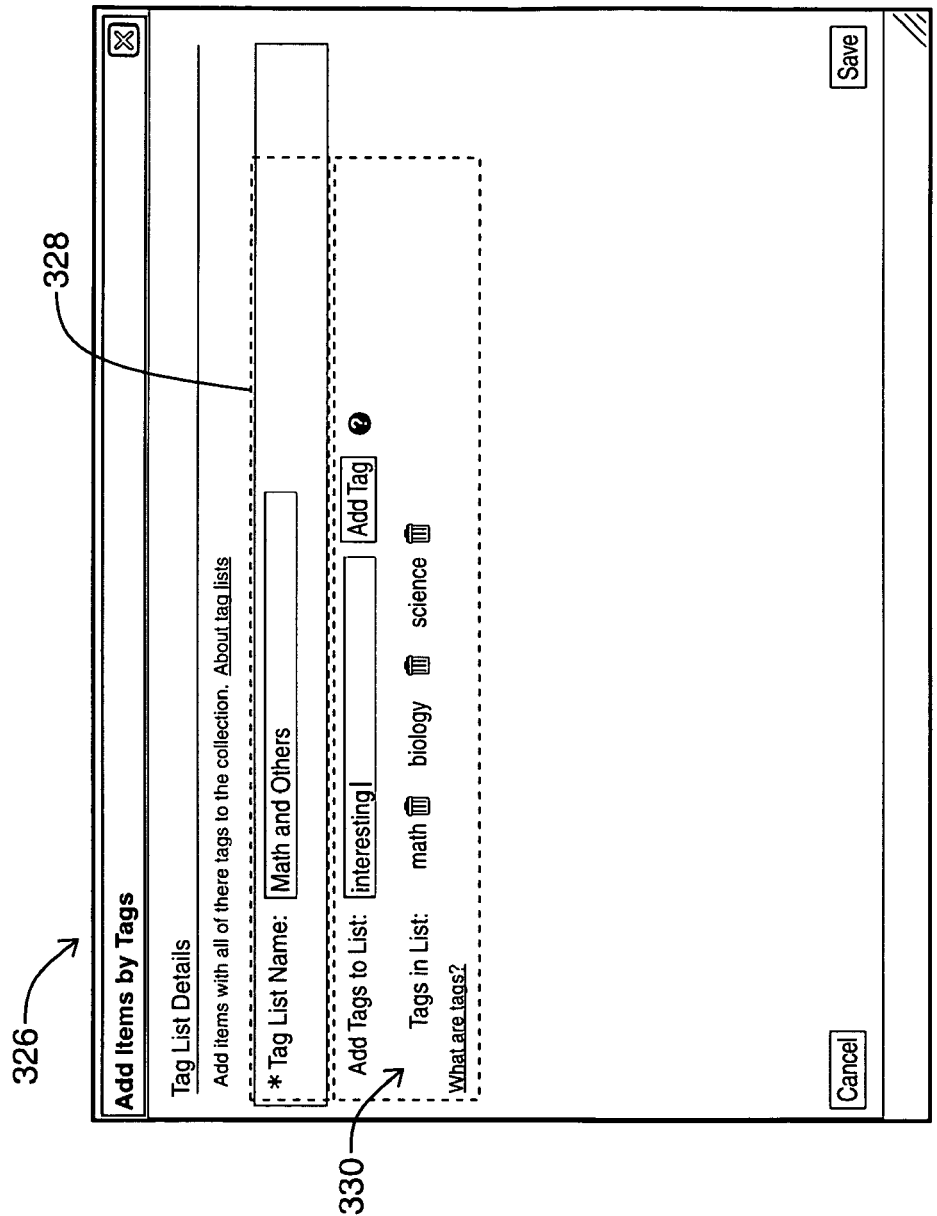
FIG. 31 is a screenshot of another add items page for adding items to the collection of FIG. 27 based on tags associated with those items.

In some embodiments, at least one of the digital items added to the collection may be associated therewith based on dynamic associations formed using at least one keyword or tag associated with the digital artifacts. For example, by clicking on the link 322b as shown on the add items page 322, a dynamic add items page 326 may be used to add digital items to the collection (as shown in FIG. 31). A particular list name 328 (e.g. "Math and Others") may be associated with one or more tags 330 (e.g. "math", "biology", "science"). When saved, the tags 330 may be used to automatically search for particular digital items, and when a similarity or a match is found, automatically add the matched items to that collection.

In some embodiments, each collection may include local digital items associated with a particular electronic portfolio and remote digital items associated with a different electronic portfolio. In some cases, the remote digital items may be linked digital items external to the social electronic learning system 10 (e.g. digital files on an externally hosted web server, such as a You Tube video).

Figure 32:
FIG. 32 is a screenshot of a view collection page for viewing the collection of FIG. 27.

As shown in FIG. 32, the collections may be viewed using a view collection page 332, and which may allow various reflections, comments and/or assessments to be associated with that collection.

Figure 33:
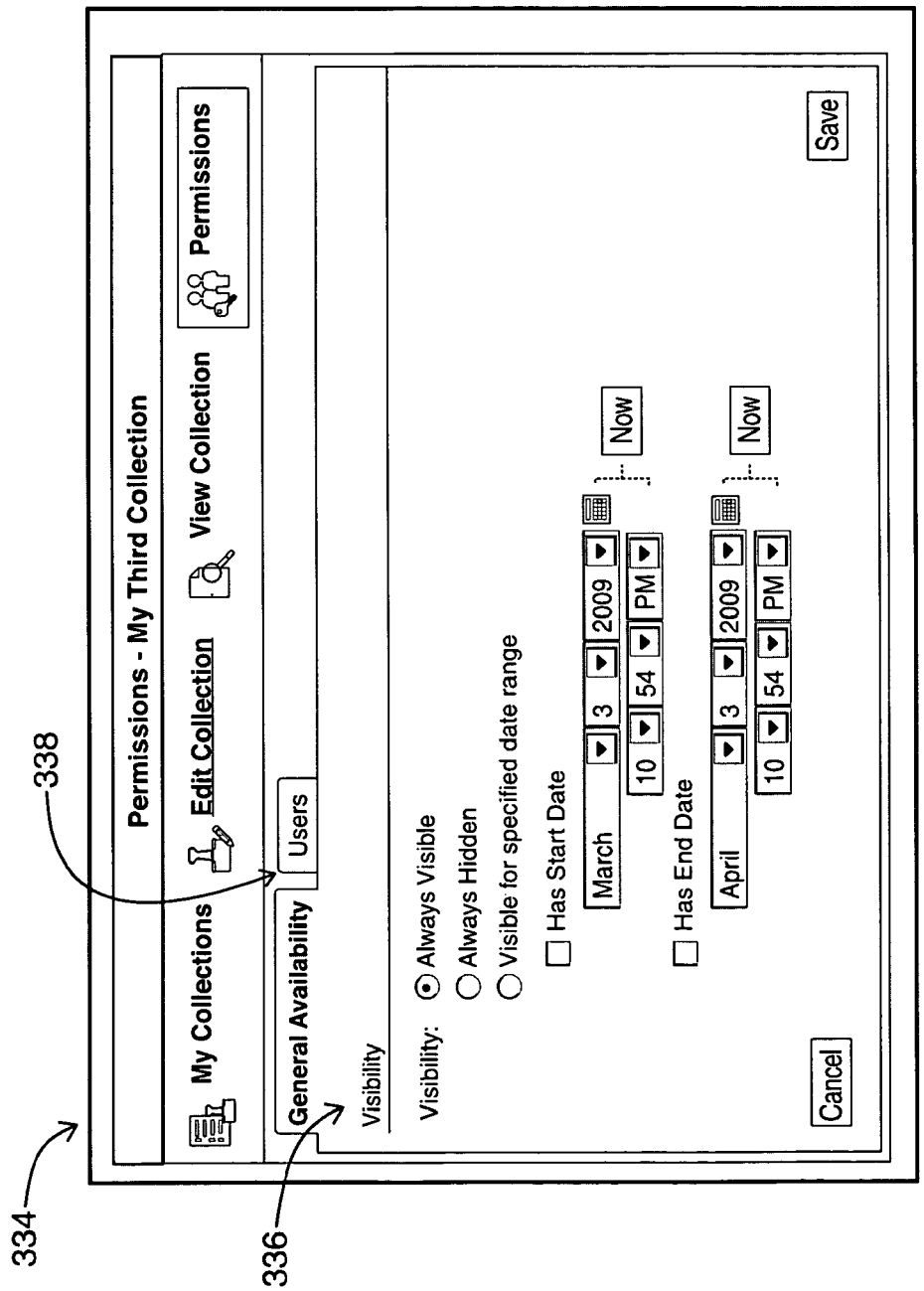
FIG. 33 is a screenshot of a permissions profiles page for setting permissions profiles for the collection of FIG. 27.

As shown in FIG. 33, each collection may also have a permissions profile associated therewith using a permissions profile page 334 for the particular collection. Similar to the permissions profile page 232 described above with respect to artifacts, users may use the permissions profile page 334 to set at least one of general availability criteria 336 and user specific access criteria 338 for a collection.

Turning now to FIG. 34, the presentations management page 130 will be described in greater detail. The presentations management page 130 is generally similar to the artifacts management page 122 and collections management page 126, and includes a search field 400 for searching for presentations, and a presentation list 402. As shown, the toolbar area 108 includes a presentations button 404 (which generally displays the presentations management page 130 as shown in FIG. 34) and a new presentation button 406.

As shown in FIGS. 35 to 38, a presentation is another specific instance of a digital item (similar to artifacts and collections), and may be created and/or edited using a presentation page 410 that allows configuration of the properties 412, the content/layout 414, the banner 416, and/or the theme 418 of that presentation.

Generally, each presentation may include one or more digital items (e.g. artifacts, collections, reflections, etc.) displayed in association with a particular theme, and which may include presenting the digital items as several pages having common color schemes, layouts, arrangements, etc. In other examples, the presentation may include only content generated for the specific presentation (e.g. a presentation may not include any digital items).

In some embodiments, the presentation may be shared with external users (e.g. public users 50) who may not be required to login to the system 10 to access the presentation.

Turning now to FIG. 39, as shown the themes page 134 may allow the user to modify themes 418 for use in presentations, such as by changing page layouts (e.g. the order and location of page elements for each particular page), color schemes, default presentations, etc.

In some embodiments, certain aspects of digital items may be locked down or configured based at least one global theme variable. For example, the themes 418 for presentations may include some branding elements that are associated with the particular educational service provider 30 (e.g. a color scheme or logo associated with a particular university or other institution may be automatically added as part of one or more themes).

Turning now to FIG. 40, as shown the reflections page 138 may allow each user to reflect on their own digital items, and/or list personal thoughts and/or information about their goals. In some examples, one or more reflections may be associated with one or more digital items generally as described above. Each reflection is another instance of a digital item, may include its own meta-data (e.g. keywords or tags) allowing it to be searchable, and can be added to collections, presentations, etc.

Turning now to FIG. 41, as shown the shared items page 142 may allow users to see the items within their electronic portfolios that they are currently sharing with other users, and may also allow each user to see whom (i.e. which other users) they are sharing digital items with.

Turning now to FIG. 42, illustrated therein is the explore page 146. The explore page 146 may allow each user to see what items from other users are currently being shared with them, as well as identify who among the other users are sharing digital items.

Turning now to FIG. 43, illustrated therein is the permissions profiles page 150. The permissions profiles page 150 may allow users to see what permissions portfolios have been defined (either by them or by other users), as well as allow users to define new permission profiles and add or delete particular users from a permissions profile.

Turning now to FIG. 44, illustrated therein is the forms page 260. The forms page 260 can allow users to create new forms (another instance of a digital item) using a new forms page 262 (as shown in FIG. 45). Once created, these new forms can be populated with various elements 266 (e.g. data fields) using the edit forms page 264 (as shown in FIG. 46). For example, some data fields (e.g. first name, last name, email address) may be predefined by the system and can be selected from a pick list. Other elements, like customized fields, and/or selection tools (e.g. radio buttons, drop down boxes, etc.) may be defined by users. Other elements (e.g. separators) can also be selected from a pick list.

Figure 47:
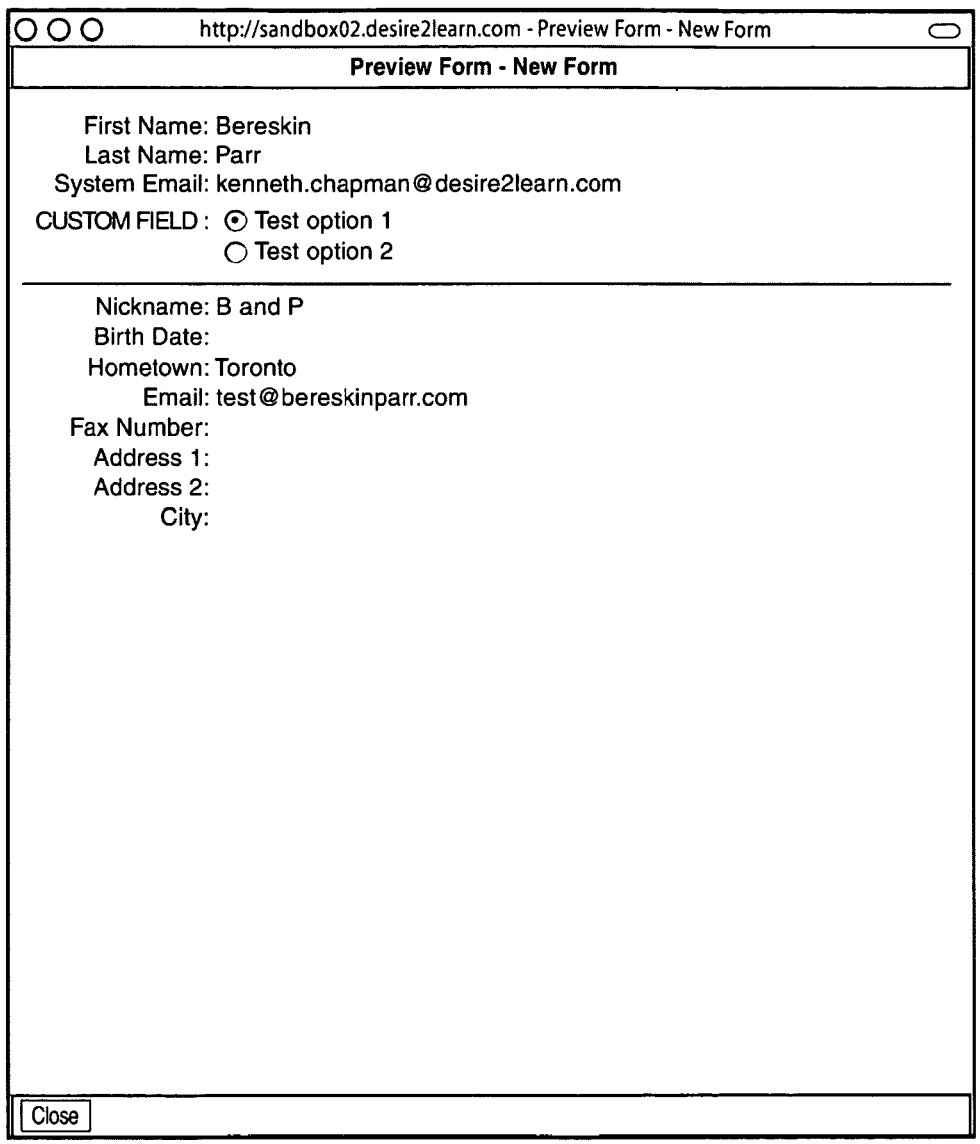
FIG. 47 is a screenshot of a preview page for previewing a created form.

The completed form can generally be previewed using a preview page 268 (as shown in FIG. 47), which can include some data pulled directly from the system (e.g. user names, nick names, etc.) and other data that must be entered by the user.

While the above description provides examples of some embodiments, it will be appreciated that some features and/or functions of the described embodiments are susceptible to modification without departing from the spirit and principles of operation of the described embodiments. Accordingly, what has been described above has been intended to be illustrative of some embodiments of the invention and non-limiting and it will be understood by persons skilled in the art that other variants and modifications may be made without departing from the scope of the claims appended hereto.

The invention claimed is:

1. A social electronic learning system, comprising:
a plurality of computing devices that communicates with a plurality of users in an educational community;
at least one server in communication with each of the plurality of computing devices, each server in communication with at least one data storage device configured to host a plurality of electronic portfolios, each electronic portfolio associated with one or more users of the plurality of users in the educational community;
wherein the at least one server presents to the one or more users an electronic page of a computing device and allows the one or more users to associate one or more digital items with each electronic portfolio on the electronic page,
wherein the one or more users are able to perform desired actions on the one or more digital items in each electronic portfolio depending on authorization criteria and wherein the desired actions are performed on the electronic page of the computing device presented to the one or more users; and
wherein the at least one server
determines whether a first user has access to at least one of the digital items on an electronic page of a computing device presented to the first user,
determines whether the first user has modified the at least one of the digital items,
if the first user has modified the at least one of the digital items, locks the at least one of the digital items against subsequent changes by the first user such that the first user can no longer make changes to the at least one of the digital items while the first user is waiting for feedback,
presents the modified at least one of the digital items to a second user, on an electronic page of a computing device presented to the second user, based on the determining whether the first user has modified the at least one of the digital items, and determines whether to present the modified at least one of the digital items to the first user, on the electronic page presented to the first user, based on actions taken by the second user on the modified at least one of the digital items, wherein the modified at least one of the digital items is presented to the first user only with data that the second user has marked as returnable to the first user.

2. The system of claim 1, wherein the authorization criteria includes at least one permission profile associated with at least one of the digital items.

3. The system of claim 1, wherein the authorization criteria include at least one global configuration profile associated with the plurality of electronic portfolios.

4. The system of claim 3, wherein the plurality of users includes at least one user authorized to set at least one global configuration profile.

5. The system of claim 1, wherein the authorization criteria includes at least one security profile associated with at least one role, each role including at least one of the plurality of users.

6. The system of claim 1, wherein the one or more digital items include at least one of artifacts, reflections, collections or presentations.

7. The system of claim 1, wherein the actions include commenting on at least one of the digital items.

8. The system of claim 1, wherein the actions include assessing at least one of the digital items.

9. The system of claim 1, wherein the actions include at least one of reading, modifying, sharing, and creating at least one of the digital items.

10. The system of claim 1, wherein the authorization criteria include at least one permission-specific criterion.

11. The system of claim 10, wherein the authorization criteria include enrollment data for the plurality of users.

12. The system of claim 1, wherein each server is configured to allow the one or more users to have different levels of control over their associated electronic portfolios.

13. The system of claim 1, wherein each server is configured to allow the plurality of users to tag digital items using at least one keyword.

14. The system of claim 1, wherein each server is configured to allow each user to perform searches across the plurality of electronic portfolios.

15. The system of claim 14, wherein results of each search return digital items based on keywords associated with said digital items.

16. The system of claim 15, wherein the results of each search return digital items about which that particular user was previously unaware.

17. The system of claim 15, wherein at least one of the keywords is dynamically defined by each user.

18. The system of claim 15, wherein at least one of the keywords is predefined.

19. The system of claim 1, wherein at least one of the digital items is an assignment item prepared by a first user and presented to a second user.

20. The system of claim 19, wherein assessment of the assignment item by the second user is performed using at least one rubric.

* * * * *